US010748269B2

(12) United States Patent
Kikuchi

(10) Patent No.: US 10,748,269 B2
(45) Date of Patent: Aug. 18, 2020

(54) STRUCTURE MEMBER SPECIFICATION DEVICE AND STRUCTURE MEMBER SPECIFICATION METHOD

(71) Applicant: FUJIFILM Corporation, Tokyo (JP)

(72) Inventor: Hiroaki Kikuchi, Tokyo (JP)

(73) Assignee: FUJIFILM Corporation, Tokyo (JP)

( * ) Notice: Subject to any disclaimer, the term of this patent is extended or adjusted under 35 U.S.C. 154(b) by 141 days.

(21) Appl. No.: 16/014,065

(22) Filed: Jun. 21, 2018

(65) Prior Publication Data

US 2018/0300868 A1    Oct. 18, 2018

Related U.S. Application Data

(63) Continuation of application No. PCT/JP2016/084643, filed on Nov. 22, 2016.

(30) Foreign Application Priority Data

Jan. 6, 2016    (JP) ................. 2016-000894

(51) Int. Cl.
*G06T 7/00* (2017.01)
*G01M 5/00* (2006.01)
(Continued)

(52) U.S. Cl.
CPC .......... *G06T 7/0002* (2013.01); *E01D 19/106* (2013.01); *G01M 5/0033* (2013.01); (Continued)

(58) Field of Classification Search
CPC ............... G06T 7/0002; G06T 7/70; G06T 2207/30184; G06T 2207/10028; (Continued)

(56) References Cited

U.S. PATENT DOCUMENTS 10,408,603 B2 * 9/2019 Shadmehri ........... G01B 11/002
2002/0140670 A1 * 10/2002 Albeck .................. G01C 11/00
345/156
(Continued)

FOREIGN PATENT DOCUMENTS

JP    H11-039490 A    2/1999
JP    2002-021329 A    1/2002
(Continued)

OTHER PUBLICATIONS

International Search Report issued in PCT/JP2016/084643; dated Feb. 21, 2017.
International Preliminary Report on Patentability issued in PCT/JP2016/084643; dated Nov. 8, 2017.

*Primary Examiner* — James M Pontius
(74) *Attorney, Agent, or Firm* — Studebaker & Brackett PC

(57) ABSTRACT

The present invention provides a structure member specification device and a structure member specification method capable of easily and accurately acquiring member identification information indicating a member included in an image of a structure captured by an imaging device when the structure is inspected. The structure member specification device acquires first space information on the structure in a local coordinate system image captured by an imaging device, and transforms the acquired first space information into second space information in a global coordinate system; prepares a member table in which third space information on each member that constitutes the structure in the global coordinate system and member identification information indicating each member are registered in an associated manner; specifies, on the basis of the transformed second space information and the third space information registered in the member table, the third space information corresponding to the second space information; and acquires member (Continued)

identification information corresponding to the specified third space information.

18 Claims, 13 Drawing Sheets

(51) Int. Cl.

| | | |
|---|---|---|
| *G06Q 10/00* | (2012.01) | |
| *G06Q 50/08* | (2012.01) | |
| *E01D 19/10* | (2006.01) | |
| *G06T 7/70* | (2017.01) | |
| *H04N 13/204* | (2018.01) | |
| *H04N 13/207* | (2018.01) | |
| *H04N 13/271* | (2018.01) | |
| *G06T 7/579* | (2017.01) | |
| *G06T 7/521* | (2017.01) | |
| *H04N 5/225* | (2006.01) | |

(52) U.S. Cl.
CPC ........ *G01M 5/0075* (2013.01); *G01M 5/0091* (2013.01); *G06Q 10/20* (2013.01); *G06Q 50/08* (2013.01); *G06T 7/70* (2017.01); *H04N 13/204* (2018.05); *G06T 7/521* (2017.01); *G06T 7/579* (2017.01); *G06T 2207/10012* (2013.01); *G06T 2207/10028* (2013.01); *G06T 2207/30184* (2013.01); *H04N 5/225* (2013.01); *H04N 13/207* (2018.05); *H04N 13/271* (2018.05)

(58) Field of Classification Search
CPC ........... G06T 2207/10012; G06T 7/521; G06T 7/579; E01D 19/106; G06Q 50/08; G06Q 10/20; G01M 5/0075; G01M 5/0033; G01M 5/0091; H04N 13/204; H04N 13/271; H04N 13/207; H04N 5/225
See application file for complete search history.

(56) References Cited

U.S. PATENT DOCUMENTS

| | | | |
|---|---|---|---|
| 2008/0036758 A1* | 2/2008 | Carpenter | ................. G06T 7/70 345/419 |
| 2009/0262145 A1 | 10/2009 | Akita et al. | |
| 2011/0134225 A1* | 6/2011 | Saint-Pierre | ........... G01B 11/03 348/47 |
| 2013/0093852 A1* | 4/2013 | Ye | .......... A61H 3/068 348/46 |
| 2013/0308013 A1* | 11/2013 | Li | ......... G01S 7/4813 348/231.3 |
| 2019/0253696 A1* | 8/2019 | Chang | ................. H04N 13/282 |

FOREIGN PATENT DOCUMENTS

| | | |
|---|---|---|
| JP | 2006-146614 A | 6/2006 |
| JP | 2007-127437 A | 5/2007 |
| JP | 2011-192270 A | 9/2011 |
| JP | 2014-020143 A | 2/2014 |

* cited by examiner

| [ELEMENT NUMBER MAIN GIRDER (Mg)] |       |       |       |
|------|------|------|------|
| 0101 | 0102 | 0103 | 0104 |
| 0201 | 0202 | 0203 | 0204 |
| 0301 | 0302 | 0303 | 0304 |
| 0401 | 0402 | 0403 | 0404 |
| 0501 | 0502 | 0503 | 0504 |

STRUCTURE MEMBER SPECIFICATION DEVICE AND STRUCTURE MEMBER SPECIFICATION METHOD

CROSS-REFERENCE TO RELATED APPLICATIONS

The present application is a Continuation of PCT International Application No. PCT/JP2016/084643 filed on Nov. 22, 2016 claiming priority under 35 U.S.C § 119(a) to Japanese Patent Application No. 2016-000894 filed on Jan. 6, 2016. Each of the above applications is hereby expressly incorporated by reference, in their entirety, into the present application.

BACKGROUND OF THE INVENTION

1. Field of the Invention

The present invention relates to a structure member specification device and a structure member specification method, and more particularly relates to a technology for specifying a member that constitutes a structure such as a bridge.

2. Description of the Related Art

A social infrastructure such as a bridge needs to be periodically inspected. When a structure is inspected, "an inspected member" and "an element number (position) of an element in the member" need to be written in an inspection record with an image (photograph) obtained by image capturing the structure during the inspection. However, when there are many similar members like a bridge, it is difficult to specify the inspected member.

In related art, there is suggested an information display device that specifies a view space of an actually captured image in accordance with the position and the imaging direction of a camera; associates the specified view space with a three-dimensional map space; and when a structure that is displayed in one of the actually captured image and the map image is designated, provides highlighted display of a structure (superposed display of a name etc.) corresponding to the designated structure (JP2007-127437A).

There is also suggested a bar arrangement inspection support system that has a storage part in which member identification information, a member sign, a member bar arrangement chart, and so forth, are recorded in an associated manner, and that specifies a member bar arrangement chart relating to a structural member included in a site photograph from the storage part, on the basis of member identification information included in the site photograph (JP2014-20143A).

SUMMARY OF THE INVENTION

The invention described in JP2007-127437A does not acquire identification information for specifying a member that constitutes a structure included in an image obtained by image capturing the structure, or does not acquire three-dimensional space information in a camera coordinate system of the structure in a view space image captured by a camera.

The invention described in JP2014-20143A is based on the premise that a two-dimensional code indicating a member sign of a structural member is attached to a board on which a constructed structural member and information relating to the construction are written, and that the board is captured in the site photograph. The site photograph and the information stored in the storage part are associated with one another by using the two-dimensional code. When the site photograph is to be captured, it is required to prepare the board to which the two-dimensional code indicating the member sign of the structural member is attached, and to capture the board in the site photograph. This is troublesome.

The present invention is made in light of the situation, and it is an object of the invention to provide a structure member specification device and a structure member specification method capable of easily and accurately acquiring member identification information indicating a member included in an image of a structure captured by an imaging device when the structure is inspected; and capable of efficiently creating an inspection record.

To attain the above-described object, a structure member specification device according to an aspect of the invention includes an imaging device that image captures a structure composed of a plurality of members; a first space information acquisition unit that acquires first space information on the structure corresponding to an imaging range of the imaging device, the first space information being first space information on the structure in a local coordinate system with reference to the imaging device; a transformation unit that transforms, on the basis of transformation information for transforming space information in the local coordinate system into space information in a global coordinate system, first space information indicating a member included in the acquired first space information on the structure into second space information in the global coordinate system; a member table in which third space information on each of the members constituting the structure in the global coordinate system and member identification information indicating each of the members are registered in an associated manner; and a member identification information acquisition unit that specifies, on the basis of the second space information indicating the member and transformed to be in the global coordinate system and the third space information registered in the member table, the third space information corresponding to the second space information, and acquires member identification information registered in association with the specified third space information from the member table. A member included in an image captured by the imaging device is specified on the basis of the member identification information acquired by the member identification information acquisition unit.

According to the aspect of the invention, first space information on a structure corresponding to an imaging range of an imaging device, the first space information being first space information on the structure in a local coordinate system with reference to the imaging device, is acquired first. The first space information includes first space information on at least a member to be inspected. The acquired first space information in the local coordinate system is transformed into second space information in a global coordinate system on the basis of transformation information.

In a member table, space information (third information) on each member that constitutes the structure in the global coordinate system and member identification information indicating each member are registered in an associated manner. For the third space information on each member, for example, a drawing plane range of each member (a space range in the global coordinate system in which the member exists), or a drawing plane indicating the drawing plane range and at least one surface of each member (for example, a plane specified by a plane equation etc.) may be used, which can be acquired from a computer aided design (CAD) drawing of the structure. For the member identification information, a combination of a member name (including a sign corresponding to the member name) and an element number may be used.

Then, the second space information is compared with the third space information on each member in the member table, the third space information corresponding to the second space information is specified, and member identification information registered in association with the specified third space information is acquired from the member table. Accordingly, member identification information indicating a member included in an image of a structure captured by the imaging device when the structure is inspected can be easily and accurately acquired, and an inspection record can be efficiently created.

Preferably in a structure member specification device according to another aspect of the invention, the transformation information is information indicating an imaging position and an imaging direction when the structure is image captured. Since the information indicating the imaging position and the imaging direction when the structure is image captured can be obtained, the first space information on the structure in the local coordinate system with reference to the imaging device can be specified, and the specified first space information can be transformed into the space information (second space information) in the global coordinate system.

Preferably in a structure member specification device according to still another aspect of the invention, the member identification information acquisition unit extracts, on the basis of a first member region in the global coordinate system in which the member exists and which corresponds to the second space information indicating the member, from second member regions in which the respective members exist in a one-to-one correspondence and which are registered in the member table, a second member region that is the most approximate to the first member region, and specifies the third space information corresponding to the extracted second member region.

A structure member specification device according to yet another aspect of the invention includes a member specification unit that detects a plane region from the first space information or the second space information, and that assumes the detected plane region as a region indicating one member. The first space information indicating the member or the second space information indicating the member is space information indicating the plane region assumed as the member by the member specification unit.

Preferably in a structure member specification device according to a further aspect of the invention, the member identification information acquisition unit extracts, on the basis of a first plane equation for specifying a plane in the plane region assumed as the member, from second plane equations indicating planes of the respective members registered in the member table, a second plane equation that is the most approximate to the first plane equation, and specifies the third space information having a plane corresponding to the extracted second plane equation.

Preferably, a structure member specification device according to a still further aspect of the invention includes an output unit that outputs the member identification information acquired by the member identification information acquisition unit. The output unit includes one that outputs the member identification information to the record unit, and one that outputs the member identification information to the display unit.

Preferably, a structure member specification device according to a yet further aspect of the invention includes a record unit that records the image captured by the imaging device and the member identification information acquired by the member identification information acquisition unit in an associated manner.

Preferably, a structure member specification device according to a yet further aspect of the invention includes an input unit that inputs at least one of a type of damage or a rank of damage on the member that is included in the image and that is specified on the basis of the member identification information. The record unit further records at least one of the type of damage or the rank of damage input by the input unit, in association with the image captured by the imaging device.

Preferably, a structure member specification device according to a yet further aspect of the invention includes a display unit that displays the image captured by the imaging device and the member identification information acquired by the member identification information acquisition unit.

Preferably, a structure member specification device according to a yet further aspect of the invention includes a selection instruction unit that, when the image captured by the imaging device includes one inspection member having damage and one or more non-inspection members not having damage and a plurality of pieces of member identification information are displayed on the display unit, gives an instruction for selecting member identification information corresponding to the inspection member from the plurality of pieces of member identification information. The member identification information acquisition unit acquires the member identification information to which the instruction for the selection is given by the selection instruction unit, as member identification information on the inspection member. When a captured image includes an inspection member and a non-inspection member, an inspector can visually recognize the inspection member. Thus, when a plurality of pieces of member identification information are displayed on the display unit, the inspector can make an instruction for selecting member identification information corresponding to the inspection member from the plurality of pieces of member identification information.

Preferably, a structure member specification device according to a yet further aspect of the invention includes an image processing unit that specifies an inspection member having damage by image processing on the basis of the image captured by the imaging device. The member identification information acquisition unit acquires the member identification information corresponding to the inspection member specified by the image processing unit, as member identification information on the inspection member. Even when an image captured by the imaging device includes one inspection member having damage, and one or more non-inspection members not having damage, the inspection member can be automatically specified.

Preferably, a structure member specification device according to a yet further aspect of the invention includes a display unit that displays an image captured by the imaging device; and a first space information designation unit that, when an image captured by the imaging device includes one inspection member having damage and one or more non-inspection members not having damage and a plurality of members are displayed on the display unit, designates the first space information indicating the inspection member or a damage position of the inspection member. The member identification information acquisition unit uses the first space information designated by the first space information designation unit, for acquiring member identification information on the inspection member.

Preferably in a structure member specification device according to a yet further aspect of the invention, the first space information acquisition unit includes a twin-lens camera including a function as the imaging device, calculates three-dimensional coordinates of the structure from two parallax images captured by the twin-lens camera, and acquires the calculated three-dimensional coordinates as first space information on the structure.

Preferably in a structure member specification device according to a yet further aspect of the invention, the first space information acquisition unit includes a time of flight camera including a function as the imaging device, and acquires three-dimensional coordinates of the structure image captured by the time of flight camera, as first space information on the structure.

Preferably in a structure member specification device according to a yet further aspect of the invention, the first space information acquisition unit includes a laser scanner including a function as the imaging device, and acquires three-dimensional coordinates of the structure acquired by the laser scanner, as first space information on the structure.

Preferably in a structure member specification device according to a yet further aspect of the invention, the first space information acquisition unit acquires three-dimensional coordinates calculated by a motion stereo method on the basis of images in time series captured while the imaging device is moved, as the first space information.

A structure member specification method according to a yet further aspect of the invention is used for an inspection system including an imaging device that image captures a structure composed of a plurality of members, and a member table in which third space information on each of the members constituting the structure in a global coordinate system and member identification information indicating each of the members are registered in an associated manner. The method includes a step of acquiring first space information on the structure corresponding to an imaging range of the imaging device, the first space information being first space information on the structure in a local coordinate system with reference to the imaging device; a step of transforming, on the basis of transformation information for transforming space information in the local coordinate system into space information in a global coordinate system, first space information indicating a member included in the acquired first space information on the structure into second space information in the global coordinate system; and a step of specifying, on the basis of the second space information indicating the member and transformed to be in the global coordinate system and the third space information registered in the member table, the third space information corresponding to the second space information, and acquiring member identification information registered in association with the specified third space information from the member table. A member included in an image captured by the imaging device is specified on the basis of the acquired member identification information.

Preferably in a structure member specification method according to a yet further aspect of the invention, the step of acquiring the member identification information from the member table includes a step of calculating a first member region in the global coordinate system in which the member exists, on the basis of second space information indicating the member, a step of extracting a second member region that is the most approximate to the first member region, on the basis of the calculated first member region, from second member regions in which the respective members exist in a one-to-one correspondence and which are registered in the member table, and a step of specifying the third space information corresponding to the extracted second member region.

Preferably, a structure member specification method according to a yet further aspect of the invention includes a step of detecting a plane region from the first space information or the second space information, and assuming the detected plane region as a region indicating one member. The first space information indicating the member or the second space information indicating the member is space information indicating the plane region assumed as the member.

Preferably, a structure member specification method according to a yet further aspect of the invention, the step of acquiring the member identification information from the member table includes a step of calculating a first plane equation for specifying a plane in the plane region assumed as the member, on the basis of the second space information indicating the member, a step of extracting a second plane equation that is the most approximate to the first plane equation, on the basis of the calculated first plane equation, from second plane equations indicating planes of the respective members registered in the member table, and a step of specifying the third space information having a plane corresponding to the extracted second plane equation.

According to the present invention, the member identification information indicating the member included in the image of the structure captured by the imaging device when the structure is inspected can be easily and accurately acquired. Hence the inspection record can be efficiently created.

DESCRIPTION OF THE PREFERRED EMBODIMENTS

A structure member specification device and a structure member specification method according to the invention are described below with reference to the accompanying drawings.

Structure of Bridge

Figure 1:
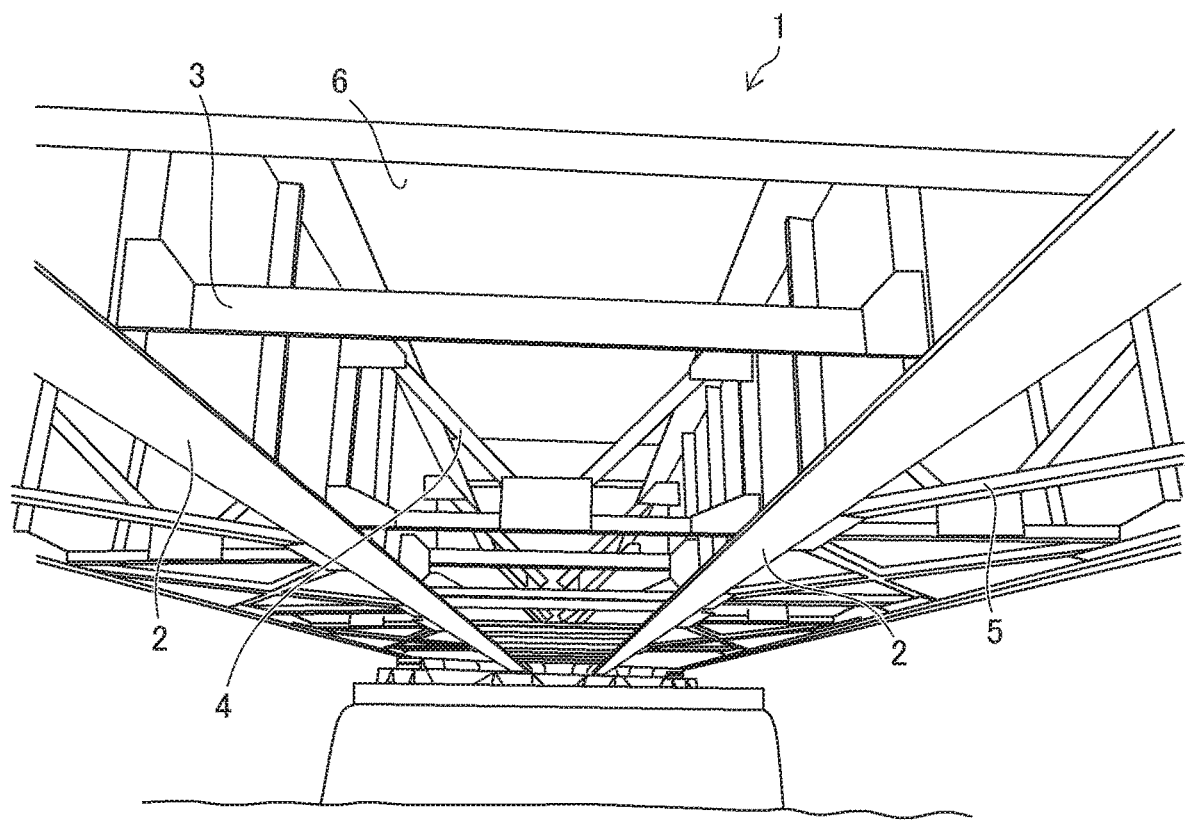
FIG. 1 is an external view of a bridge when viewed from a lower surface side.

FIG. 1 is a perspective view illustrating a structure of a bridge which is one of structures to be inspected, when viewed from below the bridge.

A bridge 1 illustrated in FIG. 1 includes a main girder 2, a cross beam 3, a cross frame 4, and a lateral frame 5, and is constructed by coupling these members by bolts, rivets, or welding. In addition, a deck slab 6 that allows a vehicle and so forth to travel thereon is disposed above the main girder 2 and so forth. The deck slab 6 is typically made of reinforced concrete.

The main girder 2 is a member that spans the area between abutments or piers and that supports a load of a vehicle and so forth on the deck slab 6. The cross beam 3 is a member that couples a plurality of the main girders 2 so that the main girders 2 support the load. The cross frame 4 and the lateral frame 5 are members that couple the main girders 2 to one another to resist a lateral load caused by wind or earthquake.

Appearance of Robot Device

Figure 2:
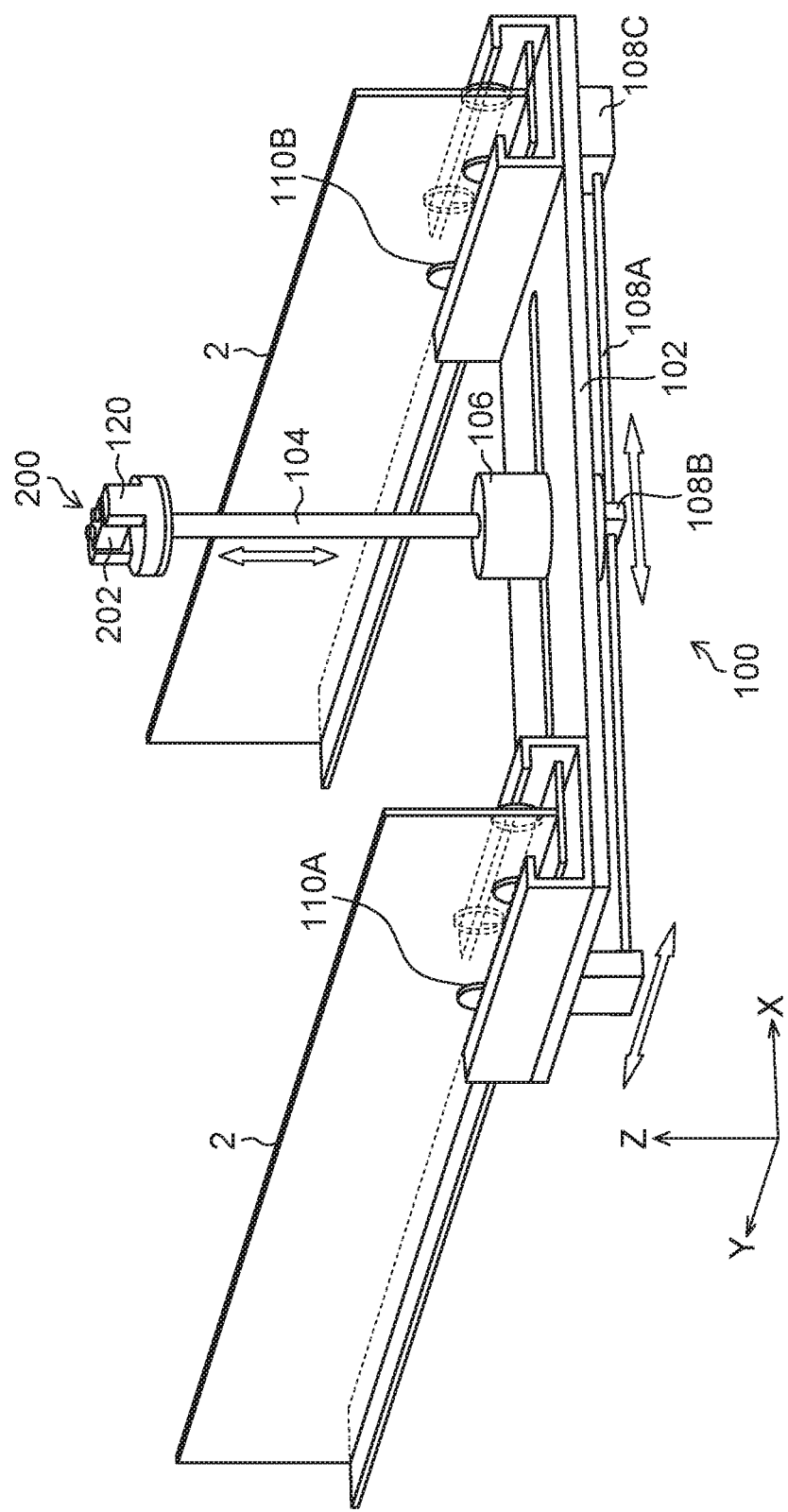
FIG. 2 is a perspective view illustrating an appearance of a robot device including a twin-lens camera.
Figure 3:
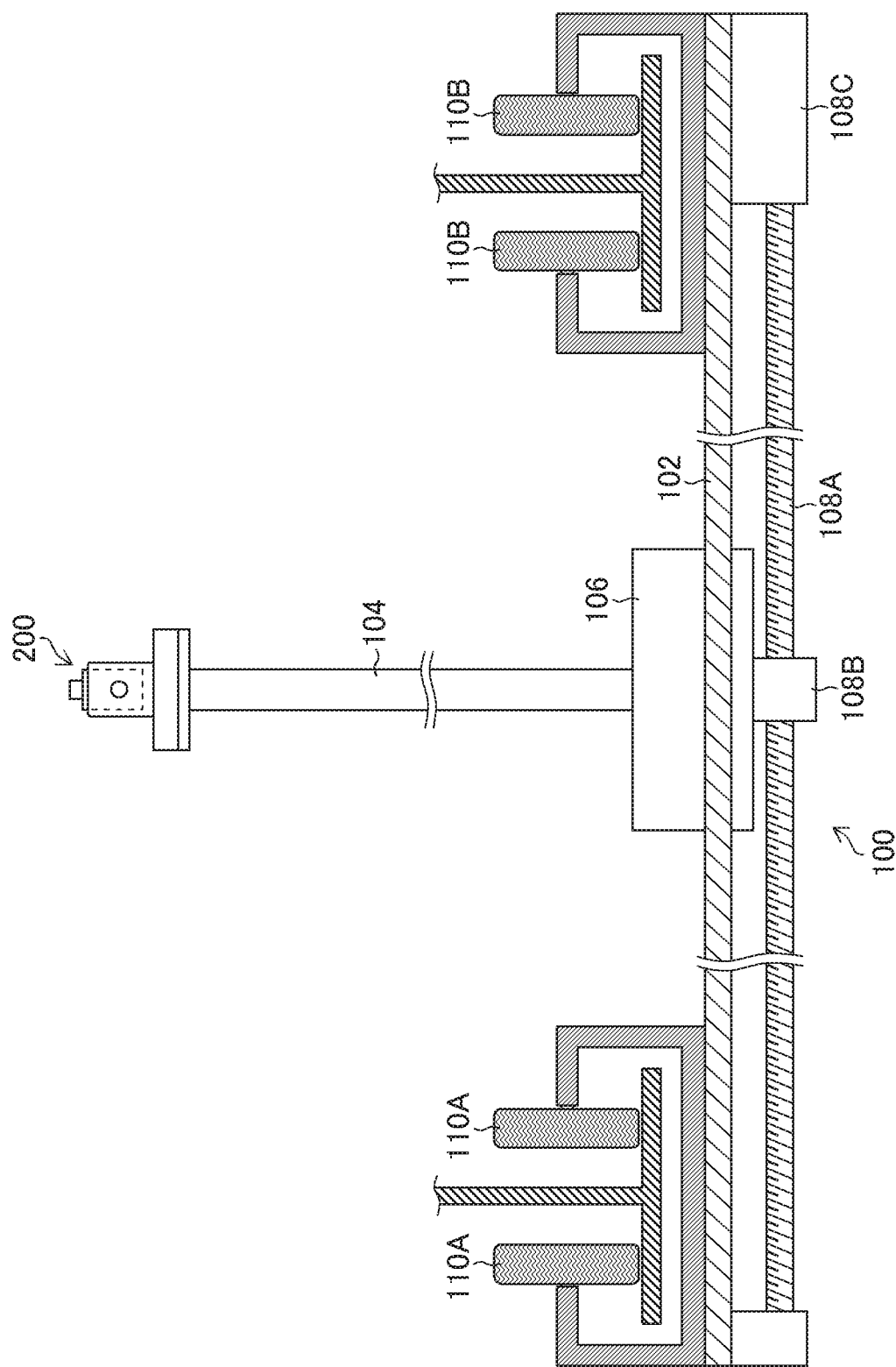
FIG. 3 is a cross-sectional view of a primary portion of the robot device illustrated in FIG. 2.

FIG. 2 is a perspective view illustrating an appearance of a robot device including a twin-lens camera, which is an embodiment of an imaging device, FIG. 2 illustrating a state in which the robot device is installed between the main girders 2 of the bridge 1. FIG. 3 is a cross-sectional view of a primary portion of the robot device illustrated in FIG. 2.

As illustrated in FIGS. 2 and 3, a robot device 100 includes an imaging device 200, controls the position (imaging position) of the imaging device 200 in a three-dimensional space, controls the imaging direction of the imaging device 200, and image captures a desirable inspection member of the bridge 1 composed of a plurality of members when the bridge 1 is inspected.

Although described later in detail, the robot device 100 includes a main frame 102, a vertical expansion arm 104, a housing 106 in which a driving unit of the vertical expansion arm 104, various control units, and other units are arranged, an X-direction driving unit 108 (FIG. 5) that moves the housing 106 in a longitudinal direction of the main frame 102 (a direction orthogonal to a longitudinal direction of the main girders 2) (X direction), a Y-direction driving unit 110 (FIG. 5) that moves the entire robot device 100 in the longitudinal direction of the main girders 2 (Y direction), and a Z-direction driving unit 112 (FIG. 5) that expands and contracts the vertical expansion arm 104 in a vertical direction (Z direction).

The X-direction driving unit 108 is composed of a ball screw 108A disposed in the longitudinal direction of the main frame 102 (X direction), a ball nut 108B disposed at the housing 106, and a motor 108C that rotates the ball screw 108A. The X-direction driving unit 108 moves the housing 106 in the X direction by the motor 108C rotating the ball screw 108A forward or backward.

The Y-direction driving unit 110 is composed of tires 110A and 110B disposed on both ends of the main frame 102, and motors (not illustrated) disposed in the tires 110A and 110B. The Y-direction driving unit 110 moves the entire robot device 100 in the Y direction by the motors driving the tires 110A and 110B.

The robot device 100 is installed in a manner that the tires 110A and 110B at both the ends of the main frame 102 are placed on lower flanges of the main girders 2 at two positions and sandwich the main girders 2. Thus, the robot device 100 can move (be self-propelled) along the main girders 2 while being suspended from the lower flanges of the main girders 2. Although not illustrated, the main frame 102 is configured such that the length thereof is adjustable depending on the distance between the main girders 2.

The vertical expansion arm 104 is disposed at the housing 106 of the robot device 100, and moves in the X direction and the Y direction together with the housing 106. The vertical expansion arm 104 expands and contracts in the Z direction by the Z-direction driving unit 112 (FIG. 5) provided in the housing 106.

Figure 4:
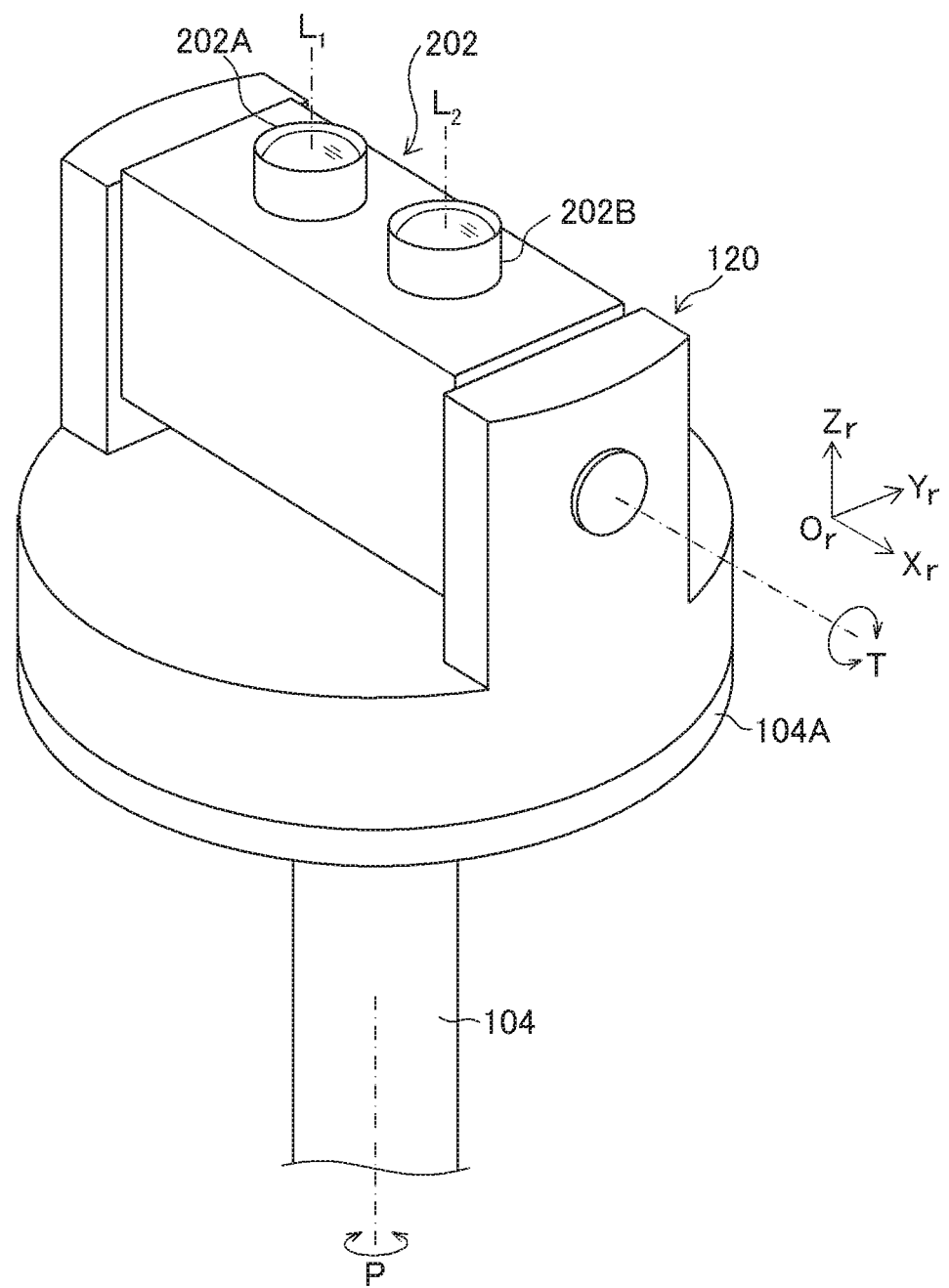
FIG. 4 is an external perspective view of the twin-lens camera and a pan-tilt mechanism.

As illustrated in FIG. 4, a camera installation portion 104A is provided at a tip end of the vertical expansion arm 104. A twin-lens camera 202 is installed at the camera installation portion 104A. The twin-lens camera 202 is rotatable in a pan direction and a tilt direction by a pan-tilt mechanism 120.

The twin-lens camera 202 has a first imaging unit 202A and a second imaging unit 202B that capture two images (stereoscopic images) with different parallax, functions as a part of a first space information acquisition unit that acquires first space information on a structure (bridge 1) corresponding to an imaging range of the twin-lens camera 202, the first space information being first space information on the bridge 1 in a local coordinate system (camera coordinate system) with reference to the twin-lens camera 202, and acquires at least one of two captured images as an "inspection image" that is attached to an inspection record.

Figure 5:
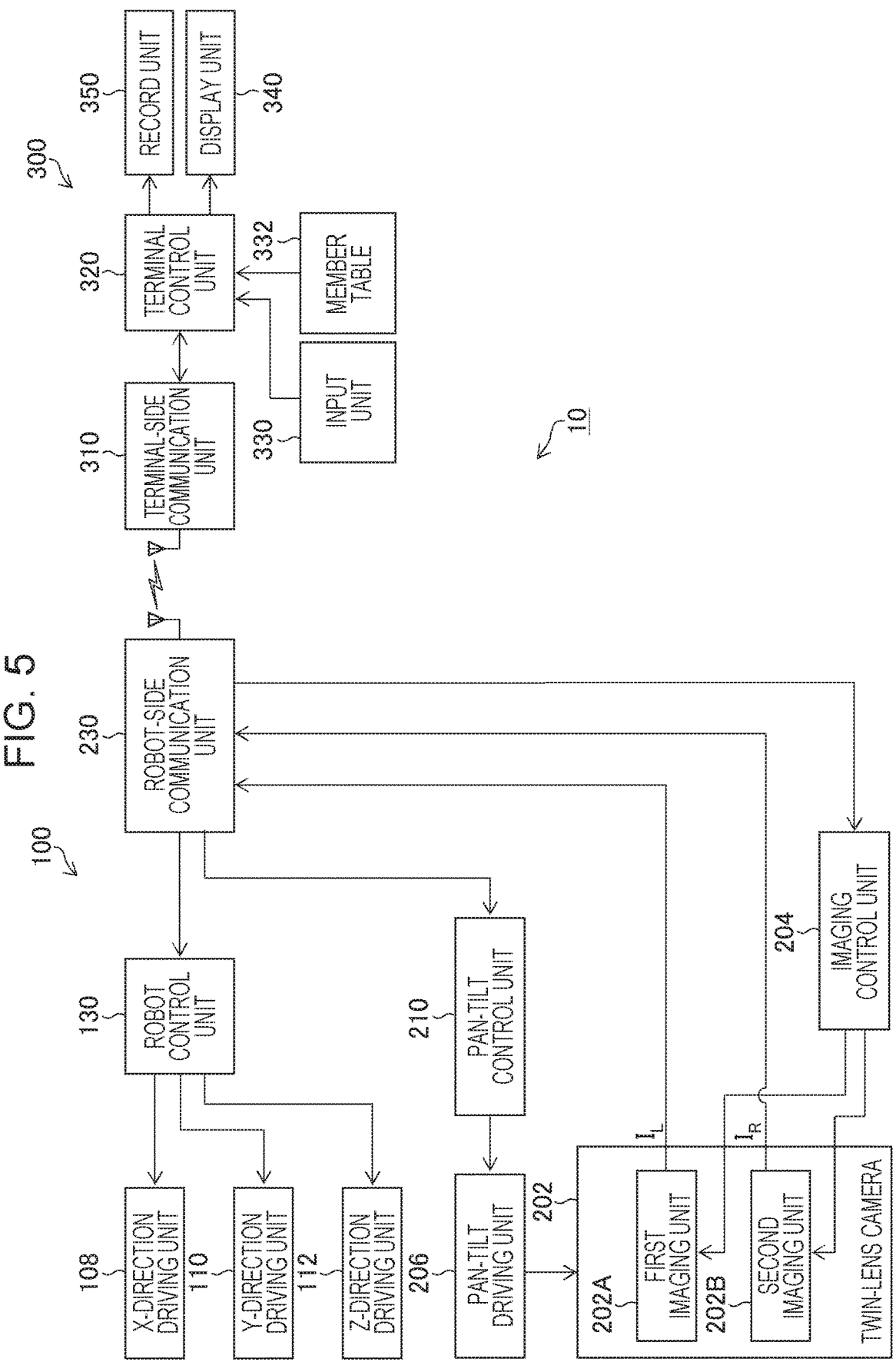
FIG. 5 is a block diagram illustrating an embodiment of an inspection system including a structure member specification device according to the invention.

The twin-lens camera 202 is rotated around a pan axis P that is coaxial with the vertical expansion arm 104, or is rotated around a tilt axis T in a horizontal direction by the pan-tilt mechanism 120 to which driving force is added from a pan-tilt driving unit 206 (FIG. 5). Thus, the twin-lens camera 202 can perform imaging in a desirable posture (imaging in a desirable imaging direction).

An optical axis $L_1$ of the first imaging unit 202A and an optical axis $L_2$ of the second imaging unit 202B of the twin-lens camera 202 according to this embodiment are parallel to one another. The pan axis P is orthogonal to the tilt axis T. The base line of the twin-lens camera 202 (that is, the installation distance between the first imaging unit 202A and the second imaging unit 202B) is known.

For the camera coordinate system with reference to the twin-lens camera 202, it is assumed that an origin Or is the intersection of the pan axis P and the tilt axis T, an x-axis direction is a direction of the tilt axis T, a z-axis direction is a direction of the pan axis P, and a y-axis direction is a direction orthogonal to the x axis and the y axis.

The position of the twin-lens camera 202 (the position of the origin Or of the camera coordinate system), the position which is a position in a global coordinate system (bridge coordinate system) (hereinafter, referred to as "imaging position"), can be detected by the global positioning system (GPS) (hereinafter, referred to as "GPS device"), or can be detected on the basis of the moving amounts of the robot device 100 in the X direction and the Y direction and the moving amount of the vertical expansion arm 104 in the Z direction with respect to the origin of the bridge coordinate system. The imaging direction of the twin-lens camera 202 can be detected by a pan angle at and a tilt angle 3 of the pan-tilt mechanism, or can be detected by an azimuth sensor (not illustrated) mounted on the twin-lens camera 202.

Configuration of Inspection System 10 Including Structure Member Specification Device FIG. 5 is a block diagram illustrating an embodiment of an inspection system including a structure member specification device according to the invention.

As illustrated in FIG. 5, an inspection system 10 is composed of a robot control unit (movable body control unit) 130, the X-direction driving unit 108, the Y-direction driving unit 110, and the Z-direction driving unit 112 on the robot device 100 side; and the twin-lens camera 202, an imaging control unit 204, a pan-tilt control unit 210, and the pan-tilt driving unit 206 on the imaging device 200 side; a robot-side communication unit 230; and a terminal device 300.

The robot-side communication unit 230 performs two-way wireless communication with a terminal-side communication unit 310. The robot-side communication unit 230 receives various commands that are transmitted from the terminal-side communication unit 310, the commands including, for example, a moving command for controlling the movement of the robot device 100, a pan-tilt command for controlling the pan-tilt mechanism 120, and an imaging command for controlling the twin-lens camera 202; and outputs the received commands to corresponding control units. The details of the terminal device 300 will be described later.

The robot control unit 130 controls the X-direction driving unit 108, the Y-direction driving unit 110, and the Z-direction driving unit 112 on the basis of the moving command that is input from the robot-side communication unit 230, causes the robot device 100 to move in the X direction and the Y direction, and causes the vertical expansion arm 104 to expand or contract in the Z direction (see FIG. 2).

The pan-tilt control unit 210 causes the pan-tilt mechanism 120 to move in the pan direction and the tilt direction via the pan-tilt driving unit 206 on the basis of the pan-tilt command that is input from the robot-side communication unit 230, and causes the twin-lens camera 202 to pan and tilt in a desirable direction (see FIG. 4).

The imaging control unit 204 causes the first imaging unit 202A and the second imaging unit 202B of the twin-lens camera 202 to capture a live view image or an inspection image on the basis of the imaging command that is input from the robot-side communication unit 230.

Image data indicating a first image $I_L$ and a second image $I_R$ with different parallax captured by the first imaging unit 202A and the second imaging unit 202B of the twin-lens camera 202 when the bridge 1 is inspected, and information indicating the imaging position (the position of the origin Or of the camera coordinate system in the bridge coordinate system) and the imaging direction (in this embodiment, the pan angle at and the tilt angle (3) of the twin-lens camera 202 are transmitted to the terminal-side communication unit 310 via the robot-side communication unit 230.

The terminal device 300 is operated by an inspector who operates the inspection system 10. The terminal device 300 is mainly composed of the terminal-side communication unit 310, a terminal control unit 320, an input unit 330 that functions as an operating unit, a member table 332, a display unit 340, and a record unit 350. For example, a tablet terminal can be applied to the terminal device 300.

The terminal-side communication unit 310 performs two-way wireless communication with the robot-side communication unit 230. The terminal-side communication unit 310 receives various pieces of information that are input from the robot-side communication unit 230 (the image data indicating the live view image, and the first image $I_L$ and the second image $I_R$ captured by the first imaging unit 202A and the second imaging unit 202B, the information indicating the imaging position and the imaging direction of the twin-lens camera 202), and transmits various commands corresponding to operations at the input unit 330 input through the terminal control unit 320 to the robot-side communication unit 230.

The terminal control unit 320 outputs the image data indicating the live view image received via the terminal-side communication unit 310 to the display unit 340, and causes the display unit 340 to display the live view image on the screen of the display unit 340. The input unit 330 has a robot operation input unit, a pan-tilt operation input unit, and an imaging operation input unit. The robot operation input unit outputs the moving command that causes the robot device 100 (twin-lens camera 202) to move in the X direction, Y direction, and Z direction. The pan-tilt operation input unit outputs the pan-tilt command that causes the pan-tilt mechanism 120 (twin-lens camera 202) to rotate in the pan direction and the tilt direction. The imaging operation input unit outputs the imaging command that instructs the twin-lens camera 202 to capture the inspection image. The inspector manually operates the input unit 330 while watching the live view image displayed on the display unit 340. The input unit 330 outputs the various commands including, for example, the moving command and the pan-tilt command for the twin-lens camera 202 in the X direction, Y direction, and Z direction, and the imaging command to the terminal control unit 320 in accordance with the operation by the inspector. The terminal control unit 320 transmits the various commands input from the input unit 330 to the robot-side communication unit 230 via the terminal-side communication unit 310.

The terminal control unit 320 has a function of acquiring member identification information for specifying each of members that constitute a structure (bridge 1) included in an inspection image on the basis of the information registered in the member table 332.

Figure 6:
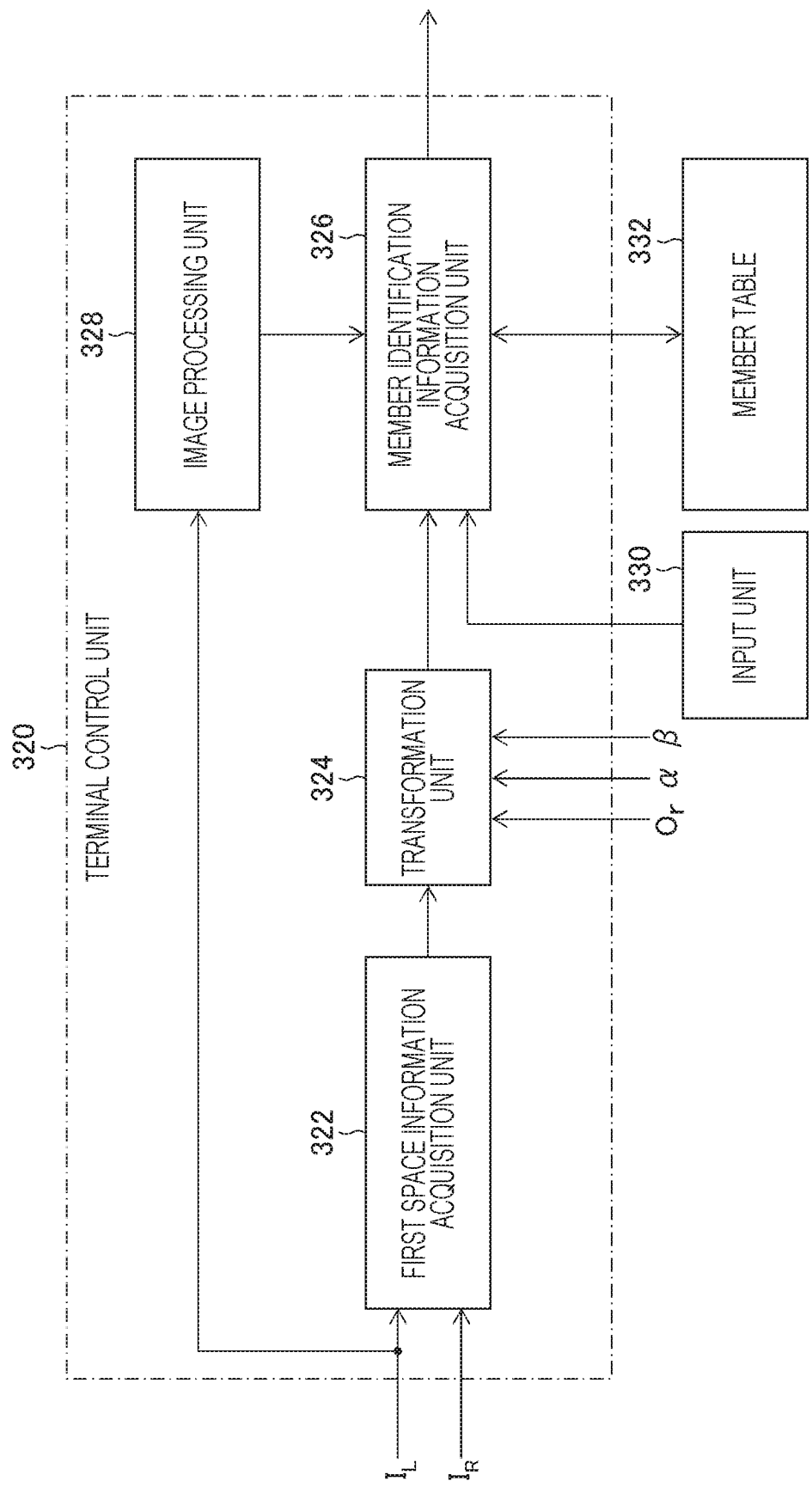
FIG. 6 is a block diagram of a primary portion of a terminal control unit illustrated in FIG. 5.

FIG. 6 is a block diagram of a primary portion of the terminal control unit 320 illustrated in FIG. 5. In particular, FIG. 6 illustrates a part that acquires member identification information for specifying a member to be inspected included in an inspection image.

As illustrated in FIG. 6, the terminal control unit 320 is mainly composed of a first space information acquisition unit 322, a transformation unit 324, a member identification information acquisition unit 326, and an image processing unit 328.

The first space information acquisition unit 322 acquires first space information on a structure corresponding to an imaging range of the imaging device 200, the first space information being first space information on the structure in the camera coordinate system. In this embodiment, the first space information acquisition unit 322 calculates three-dimensional coordinates of the structure on the basis of the image data indicating the first image $I_L$ and the second image $I_R$ with parallax captured by the twin-lens camera 202, and acquires the calculated three-dimensional coordinates as the first space information on the structure.

Figure 7:
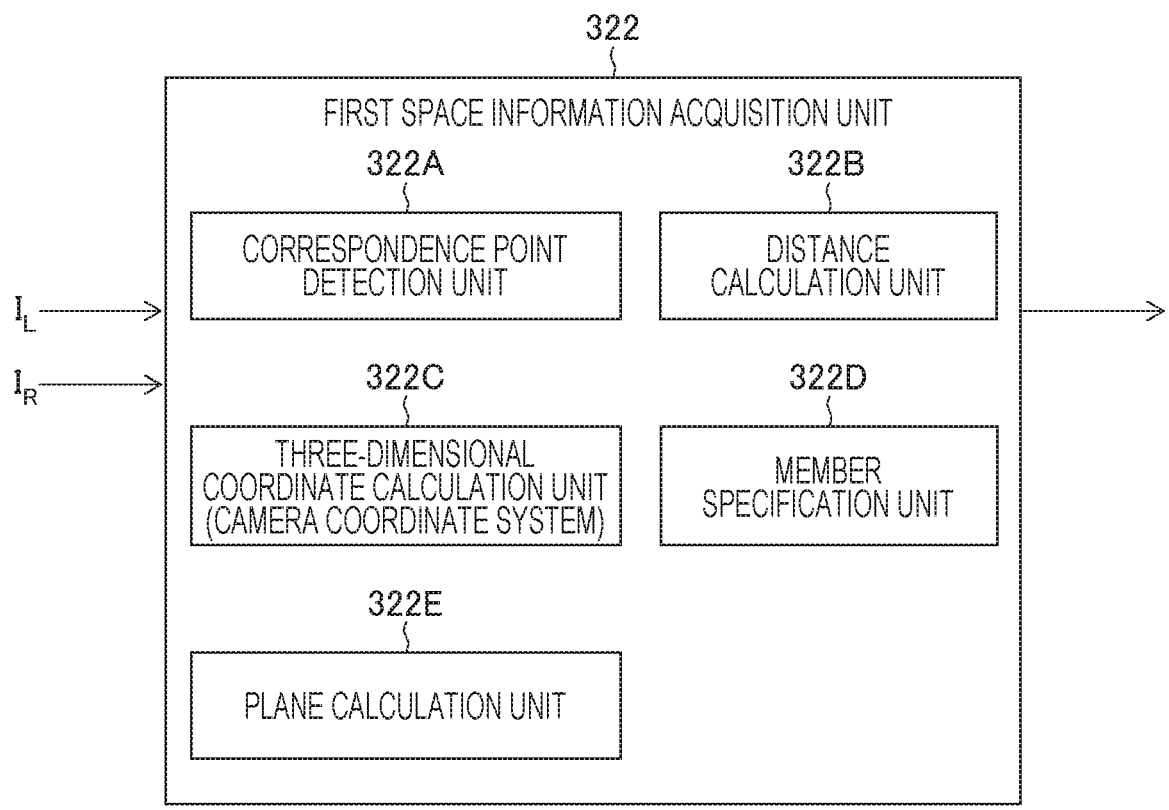
FIG. 7 is a functional block diagram illustrating a configuration example of a first space information acquisition unit illustrated in FIG. 6.

FIG. 7 is a functional block diagram illustrating a configuration example of the first space information acquisition unit 322 illustrated in FIG. 6.

As illustrated in FIG. 7, the first space information acquisition unit 322 is composed of a correspondence point detection unit 322A, a distance calculation unit 322B, a three-dimensional coordinate calculation unit 322C, a member specification unit 322D, and a plane calculation unit 322E.

The correspondence point detection unit 322A specifies a plurality of feature points in the first image $I_L$ (for example, a portion with high contrast, such as an edge in the image), and detects correspondence points in the second image $I_R$ corresponding to the plurality of specified feature points.

The distance calculation unit 322B calculates an imaging distance from the twin-lens camera 202 (the origin Or of the camera coordinate system) for each feature point on the basis of, for example, a shift amount (parallax amount) between a pair of a feature point and a correspondence point detected by the correspondence point detection unit 322A, and the base line of the twin-lens camera 202.

The three-dimensional coordinate calculation unit 322C calculates three-dimensional coordinates of a plurality of feature points in the camera coordinate system (rectangular coordinate system) on the basis of the imaging distance and the position in the imaging range of each feature point calculated by the distance calculation unit 322B. That is, the three-dimensional coordinates of a feature point are expressed by polar coordinates using the imaging distance (moving radius) of the feature point calculated by the distance calculation unit 322B and the direction (polar angle) corresponding to the position in the imaging range of the twin-lens camera 202. The three-dimensional coordinate calculation unit 322C transforms the three-dimensional coordinates of the plurality of feature points expressed in the polar coordinates into the three-dimensional coordinates in the camera coordinate system (rectangular coordinate system).

The member specification unit 322D detects a plane region from the first space information acquired by the first space information acquisition unit 322, and assumes the detected plane region as a region indicating one member. In this embodiment, the member specification unit 322D has a function of detecting a plane region on the basis of the three-dimensional coordinates of the plurality of feature points calculated by the three-dimensional coordinate calculation unit 322C, and classifying the plurality of feature points on a plane region (member) basis.

Figure 8:
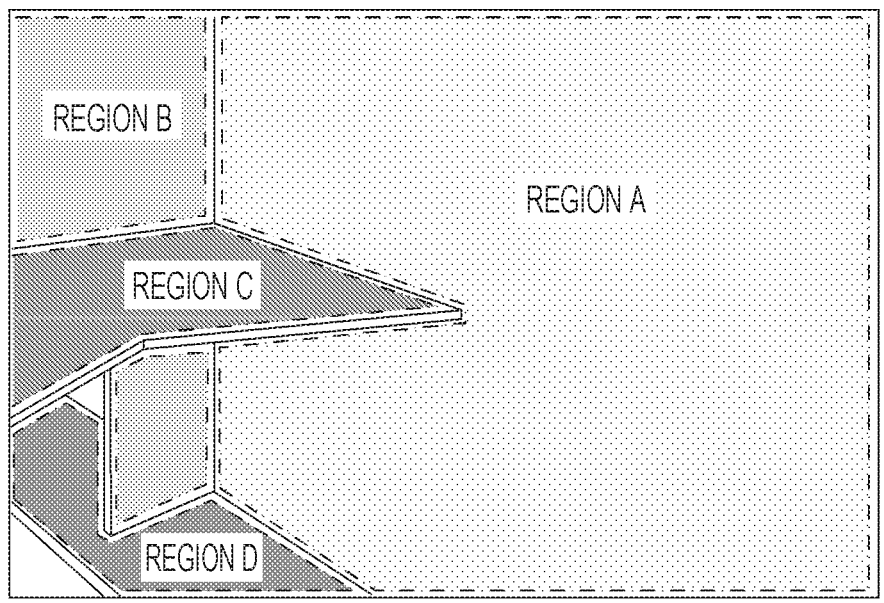
FIG. 8 illustrates an image in an imaging range of a structure captured by the twin-lens camera.

FIG. 8 illustrates an image in an imaging range of a structure captured by the twin-lens camera 202.

Four regions A, B, C, and D illustrated in FIG. 8 each are a plane region of each of the members that constitute the bridge 1. One member may include two or more plane regions.

A method of classifying the plurality of feature points on a plane basis may be classifying the plurality of feature points into feature point groups, each of which has three-dimensional coordinates with high correlation, on the basis of the three-dimensional coordinates of the plurality of feature points. Regarding the feature points on the same plane, each coordinate value of the three-dimensional coordinates linearly changes, and thus the plurality of feature points can be classified on a plane basis.

Another method of classifying the plurality of feature points on a plane basis is, for example, analyzing the first image $I_L$ captured by the first imaging unit 202A of the twin-lens camera 202, extracting the boundary lines of each member, and assuming a region defined by the extracted boundary lines as a measurement plane of the member. Then, the plurality of feature points are classified on a measurement plane basis in accordance with the regions to which the plurality of feature points belong. The method of classifying the plurality of feature points on a measurement plane basis is not limited to the above-described example, and various methods are conceivable.

The plane calculation unit 322E calculates a measurement plane on the basis of the three-dimensional coordinates of the plurality of feature points calculated by the three-dimensional coordinate calculation unit 322C, the three-dimensional coordinates being three-dimensional coordinates of the plurality of feature points classified on a measurement plane basis.

Calculating the measurement plane represents obtaining the following plane equation.

$$a_r x_r + b_r y_r + c_r z_r - d_r = 0 \quad (1)$$

In Equation 1, $x_r$, $y_r$, and $z_r$ denote variables in the three-axis orthogonal directions of the camera coordinate system; and $a_r$, $b_r$, $c_r$, and $d_r$ denote coefficients of the plane equation.

A measurement plane is determined by three points that are not on the same straight line, and thus the plurality of feature points require three or more points to obtain the plane equation. A plane equation with higher accuracy (reliability) can be obtained as the number of feature points increases.

When a plurality of regions A to D corresponding to the measurement planes of the respective members exist as illustrated in FIG. 8, the plane calculation unit 322E obtains the plane equations of the respective regions A to D. The region A among the regions A to D is a region in the imaging range, and is defined by being adjacent to (intersecting with) the regions B, C, and D. When specifying the measurement plane corresponding to the region A, the plane calculation unit 322E specifies the measurement plane by using the plane equation corresponding to the region A and the range of the region A.

In this case, the range of the region A represents possible ranges of $x_r$, $y_r$, and $z_r$ of the plane equation as shown in the following expressions (hereinafter, referred to as "measurement plane range").

$$x_{rmin} \leq x_r \leq x_{rmax}$$

$$y_{rmin} \leq y_r \leq y_{rmax}$$

$$z_{rmin} \leq z_r \leq z_{rmax} \quad (2)$$

The plane calculation unit 322E specifies the measurement planes corresponding to the regions B, C, and D by using the plane equations and the measurement plane ranges of the measurement planes of the regions.

In this way, the first space information acquisition unit 322 acquires the three-dimensional coordinates (the plane equation and the measurement plane range) of the measurement plane of each member in the imaging range of the twin-lens camera 202, as the first space information on each member of the structure, on the basis of the image data indicating the first image $I_L$ and the second image $I_R$ with parallax captured by the twin-lens camera 202.

The first space information on each member of the structure in the camera coordinate system acquired by the first space information acquisition unit 322 is output to the transformation unit 324.

Figure 9:
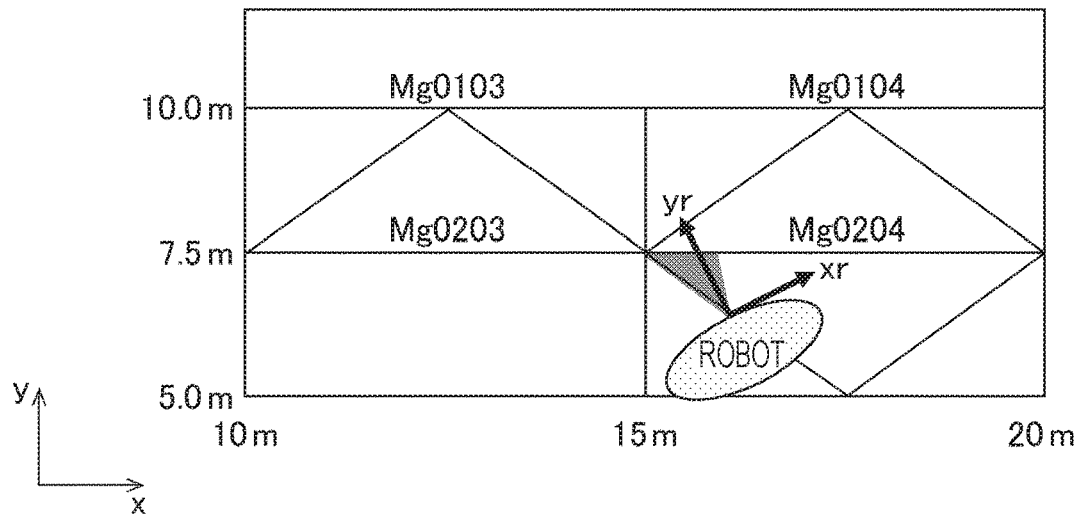
FIG. 9 illustrates the relationship between a measurement plane in a camera coordinate system image captured by the twin-lens camera and a measurement plane range in a bridge coordinate system.

FIG. 9 illustrates the relationship between the measurement plane of the camera coordinate system $(x_r, y_r, z_r)$ image captured by the twin-lens camera 202 and the measurement plane range of the bridge coordinate system (x, y, z). In the example illustrated in FIG. 9, the z direction is a direction orthogonal to the paper surface.

For other inputs of the transformation unit 324, information on the position (imaging position) of the origin Or of the camera coordinate system in the bridge coordinate system, and information on the imaging direction (pan angle α, tilt angle β) of the twin-lens camera 202 are added. The transformation unit 324 performs coordinate transformation from the first space information on each member of the structure in the camera coordinate system into space information (second space information) on each member of the structure in the bridge coordinate system on the basis of information (transformation information) indicating the imaging position and the imaging direction. That is, the transformation unit 324 transforms the first space information in the camera coordinate system into the second space information in the bridge coordinate system, by rotating the first space information on the basis of the information on the imaging direction, and translating the rotated first space information on the basis of the information on the imaging position.

The following Expression 3 and Expressions 4 show a plane equation indicating a measurement plane for a "certain region" transformed to be in the bridge coordinate system, and a measurement plane range.

$$ax+by+cz-d=0 \quad (3)$$

$$x_{min} < x < x_{max}$$

$$y_{min} < y < y_{max}$$

$$z_{min} < z < z_{max} \quad (4)$$

In Expression 3, x, y, and z denote variables in the three-axis orthogonal directions of the bridge coordinate system; and a, b, c, and d denote coefficients of the plane equation.

The second space information on which the coordinate transformation is performed by the transformation unit 324 is output to the member identification information acquisition unit 326.

In this embodiment, the member specification unit 322D detects the plane region on the basis of the three-dimensional coordinates in the camera coordinate system of the plurality of feature points (first space information), and the plane calculation unit 322E calculates the first plane equation, the measurement plane range, etc., of the measurement plane on the basis of the three-dimensional coordinates in the camera coordinate system of the plurality of feature points in the detected plane region (first space information). However, it is not limited thereto. The member specification unit 322D may detect the plane region on the basis of the three-dimensional coordinates of the plurality of feature points after transformation to be in the bridge coordinate system (second space information), and the plane calculation unit 322E may calculate the first plane equation, the measurement plane range, etc., of the measurement plane on the basis of the three-dimensional coordinates in the bridge coordinate system of the plurality of feature points in the detected plane region (second space information).

First Embodiment of Member Identification Information Acquisition

The member identification information acquisition unit 326 acquires, from the member table 332, the member identification information for uniquely specifying the member included in the image captured by the twin-lens camera 202 on the basis of the second space information input from the transformation unit 324 (information indicating the plane equation indicating the measurement plane in the bridge coordinate system, and the measurement plane range) and the information stored in the member table 332.

The member table 332 is described now.

In the member table 332, space information on each member that constitutes the bridge in the bridge coordinate system (third information) and member identification information indicating each member are registered in an associated manner. For the third space information on each member, for example, a drawing plane range of each member, or a drawing plane showing the drawing plane range and at least one surface of each member (for example, a drawing plane expressed by a plane equation) may be used, the drawings which can be acquired from a computer aided design (CAD) drawing of the structure (bridge). For the member identification information, a combination of a member name (including a sign corresponding to the member name), a member number, and an element number may be used.

Figure 10:
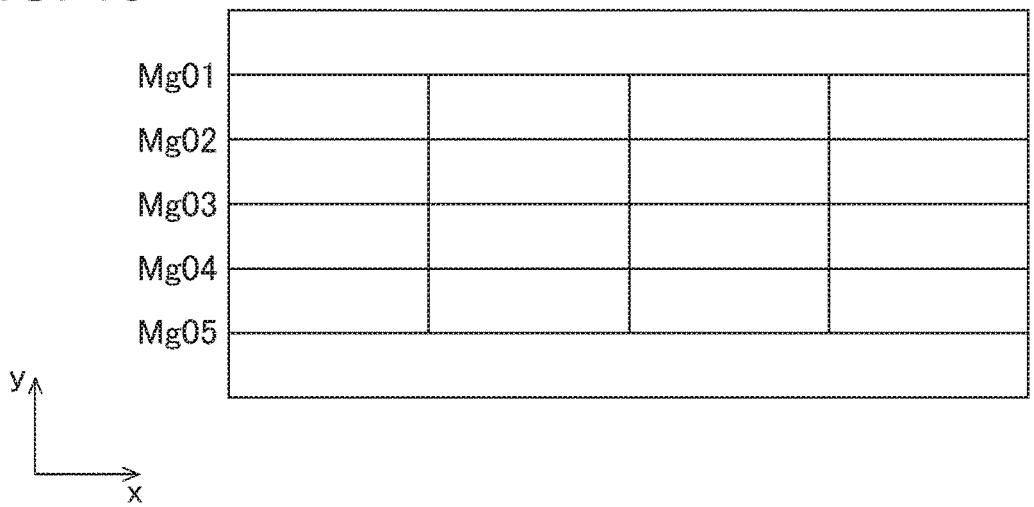
FIG. 10 illustrates member numbers of main girders of the bridge, and a drawing plane range of the bridge coordinate system.

FIG. 10 illustrates member numbers of main girders of the bridge, and a drawing plane range of the bridge coordinate system.

As illustrated in FIG. 10, the member numbers of the main girders (Mg) are expressed by Mg01, Mg02, Mg03, Mg04, and Mg05. That is, it is found that the bridge includes five main girders (Mg) expressed by Mg01 to Mg05.

While the members that constitute the bridge 1 include the main girder 2, the cross beam 3, the cross frame 4, the lateral frame 5, the deck slab 6, and so forth as illustrated in FIG. 1, the types of the members are expressed by the member signs corresponding to the member names (main girder (Mg), cross beam (Cr), cross frame (Cf), lateral frames (upper lateral frame (Lu), lower lateral frame (Ll)), desk slab (Ds), etc.).

Figure 11:
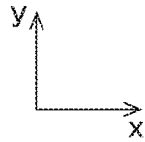
FIG. 11 illustrates element numbers of main girders of the bridge, and a drawing plane range of the bridge coordinate system.

FIG. 11 illustrates element numbers of main girders of the bridge, and a drawing plane range of the bridge coordinate system. As illustrated in the drawing, each of the element numbers is expressed by a four-digit numeral and is the number of the minimum evaluation unit of a portion or a member on which inspection and evaluation are performed. The upper two digits of the four-digit numeral of the element number indicate arrangement (row) in the longitudinal direction of the bridge, and the lower two digits indicate arrangement (column) in the direction orthogonal to the longitudinal direction of the bridge.

Thus, the member to be inspected can be uniquely specified by the combination of the member sign indicating the type of member and the element number. The combination of the member sign and the element number corresponds to the member identification information.

Figure 12:
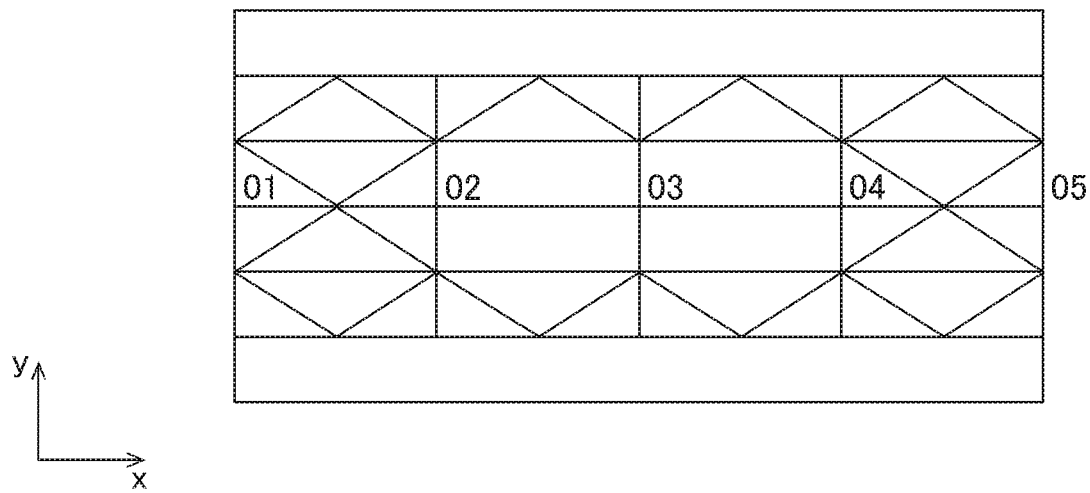
FIG. 12 illustrates member numbers of cross beams of the bridge, and a drawing plane range of the bridge coordinate system.
Figure 13:
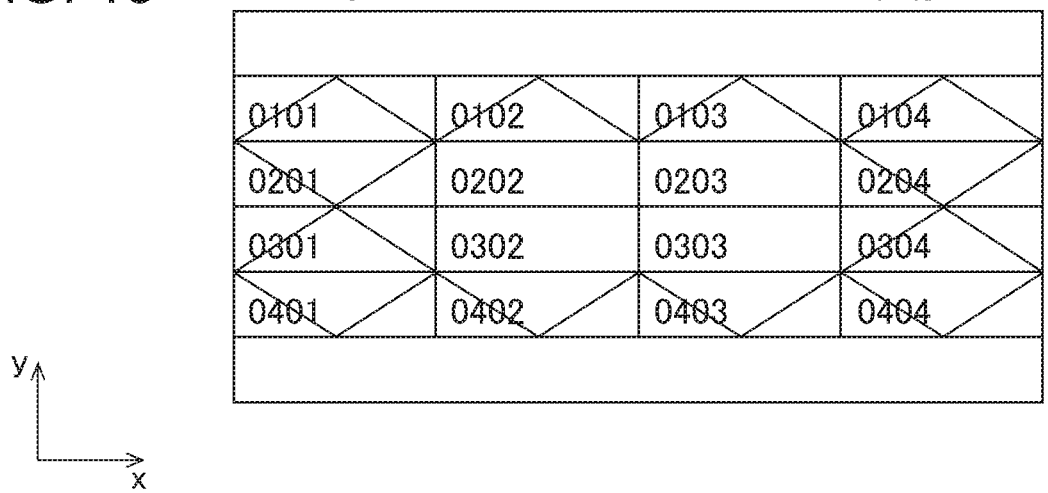
FIG. 13 illustrates element numbers of the cross beams of the bridge, and a drawing plane range of the bridge coordinate system.

Likewise, FIG. 12 illustrates member numbers of cross beams (Cr) of the bridge, and a drawing plane range of the bridge coordinate system. FIG. 13 illustrates element numbers of the cross beams (Cr) of the bridge, and a drawing plane range of the bridge coordinate system.

Figure 14:
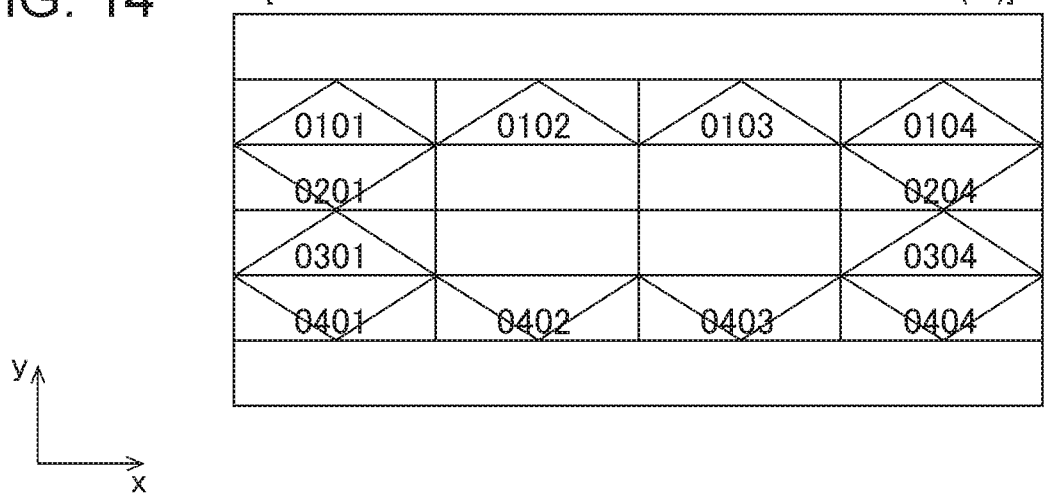
FIG. 14 illustrates element numbers of lower lateral frames of the bridge, and a drawing plane range of the bridge coordinate system.
Figure 15:
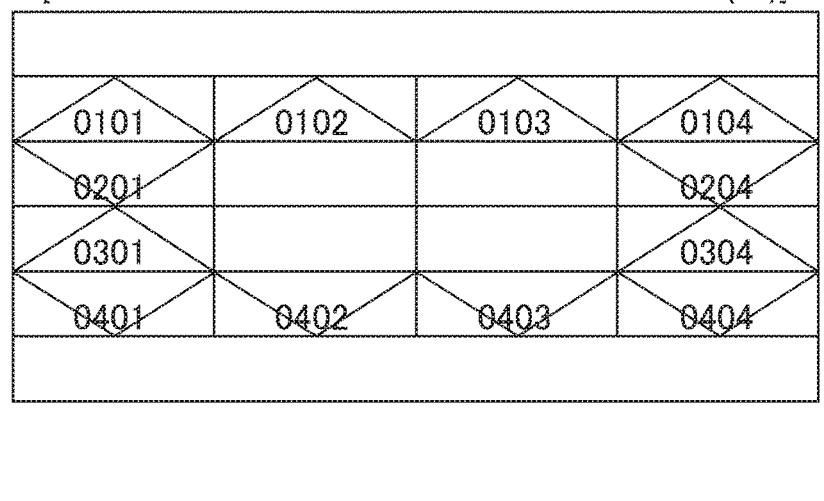
FIG. 15 illustrates element numbers of upper lateral frames of the bridge, and a drawing plane range of the bridge coordinate system.

FIG. 14 illustrates element numbers of lower lateral frames (Ll) of the bridge, and a drawing plane range of the bridge coordinate system. FIG. 15 illustrates element numbers of upper lateral frames (Lu) of the bridge, and a drawing plane range of the bridge coordinate system.

Referring back to FIG. 6, the member identification information acquisition unit 326 acquires, from the member table 332, member identification information for specifying a member included in an image captured by the twin-lens camera 202 on the basis of the second space information input from the transformation unit 324 (information indicating the plane equation indicating the measurement plane in the bridge coordinate system, and the measurement plane range), the information stored in the member table 332 (information indicating the plane equation indicating the drawing plane corresponding to the element number of each member, and the drawing plane range), and the member identification information registered in association with the aforementioned information (in this embodiment, member sign+element number).

Specifically, the member identification information acquisition unit 326 reads out plane equations indicating drawing planes P1 and P2 and drawing plane ranges A1 and A2 for an element number of a "certain member" registered in the member table 332. The plane equations indicating the drawing planes P1 and P2 and the drawing plane ranges A1 and A2 are shown as follows.

P1:

$$aa1 \cdot x + bb1 \cdot y + cc1 \cdot z - dd1 = 0$$

P2:

$$aa2 \cdot x + bb2 \cdot y + cc2 \cdot z - dd2 = 0 \qquad (5)$$

A1:

$$xx1_{min} < x < xx1_{max}$$

$$yy1_{min} < y < yy1_{max}$$

$$zz1_{min} < z < zz1_{max}$$

A2:

$$xx2_{min} < x < xx2_{max}$$

$$yy2_{min} < y < yy2_{max}$$

$$zz2_{min} < z < zz2_{max} \qquad (6)$$

The member is composed of a plurality of planes (two planes), and hence has the plane equations and drawing plane ranges A1 and A2 indicating the two drawing planes P1 and P2.

The member identification information acquisition unit 326 compares the plane equation indicating the measurement plane shown in Expression 3, with the plane equation indicating the drawing plane of "the certain member" shown in Expression 5, and obtains correspondence between the plane equations.

For example, the member identification information acquisition unit 326 calculates the correlation (inner product) between the measurement plane and the drawing plane by using the following expression.

$$\cos\theta = \frac{aa1 \cdot a + bb1 \cdot b + cc1 \cdot c}{\sqrt{(aa1^2 + bb1^2 + cc1^2)}\sqrt{(a^2 + b^2 + c^2)}} \qquad (7)$$

If the calculated correlation is 0.8 or higher, the member identification information acquisition unit 326 recognizes the planes as the same plane and narrows down target members.

Figure 16:
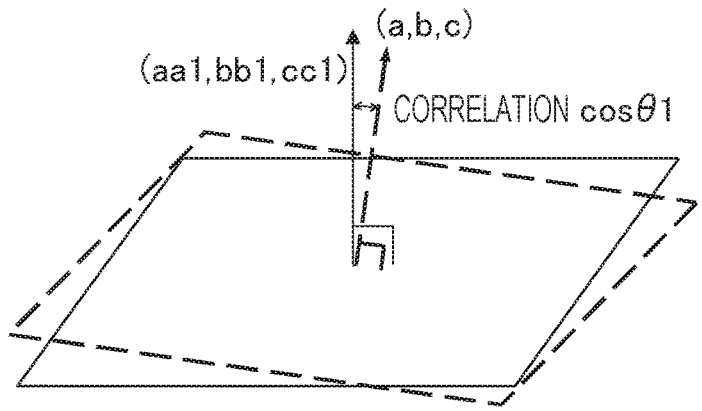
FIG. 16 illustrates a case with high correlation between a measurement plane and a drawing plane.
Figure 17:
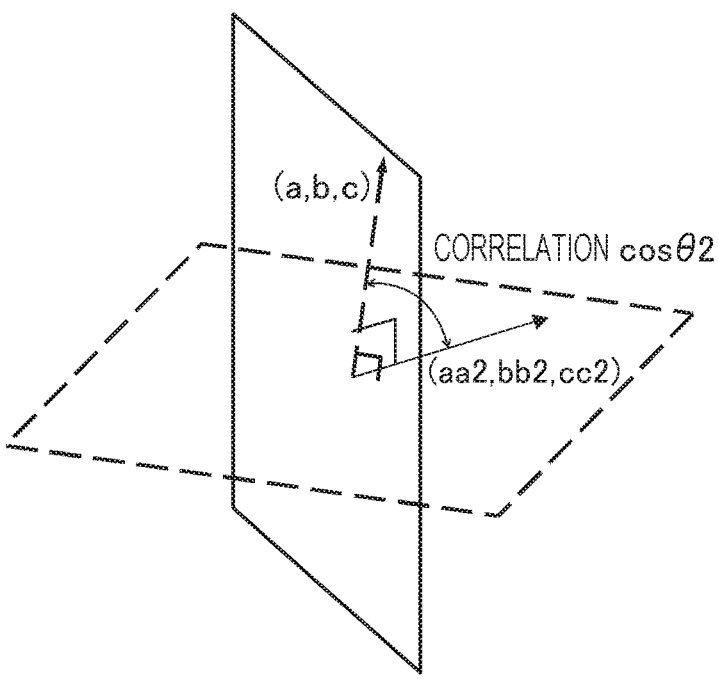
FIG. 17 illustrates a case with low correlation between a measurement plane and a drawing plane.

FIG. 16 illustrates a case with high correlation between a measurement plane and a drawing plane. FIG. 17 illustrates a case with low correlation between a measurement plane and a drawing plane.

As illustrated in FIGS. 16 and 17, it is found that the correlation between the measurement plane and the drawing plane P1 is higher than the correlation between the measurement plane and the drawing plane P2.

While only the inclinations of the planes between the measurement plane and the drawing plane are compared in this embodiment, by further comparing a coefficient d with coefficients dd1 and dd2 in the plane equations, the correspondence of the distance between the measurement plane and the drawing plane can be obtained, and thus target members can be further narrowed down.

While the correlation between the measurement plane and the drawing plane of the "certain member" is obtained in the above-described embodiment, the target members can be narrowed down by obtaining the correlation between the measurement plane and each of the drawing planes of all members registered in the member table, and obtaining the drawing plane with the highest correlation (extracting a second plane equation the most approximate to the first plane equation for specifying the measurement plane from second plane equations indicating drawing planes of the respective members registered in the member table 332, and obtaining a drawing plane corresponding to the extracted second plane equation).

Also, the member identification information acquisition unit 326 compares the measurement plane range shown in Expression 4 with the drawing plane range shown in Expression 6 etc. to specify the position in the narrowed down members. In this case, the measurement plane range shown in Expression 4 is a member region (first member region) in the bridge coordinate system in which an inspection member exists, and the drawing plane range is a member region (second member region) for each member in which each member registered in the member table 332 exists.

The member identification information acquisition unit 326 extracts a member whose measurement plane range falls within the drawing plane range from the members narrowed down by using the plan equation, and acquires member identification information (element number) registered in association with the extracted member.

The terminal control unit 320 illustrated in FIG. 5 functions as an output unit that outputs the member identification information acquired by the member identification information acquisition unit 326, to the display unit 340 and the record unit 350 (FIG. 5).

Also, the terminal control unit 320 outputs one of the image data indicating the first image $I_L$ and the image data indicating the second image $I_R$ to be input via the terminal-side communication unit 310, as the image data indicating the inspection image to the display unit 340 and the record unit 350.

The display unit 340 displays the inspection image and the member identification information on the member to be inspected in the inspection image in an associated manner on the basis of the input member identification information and the input image data indicating the inspection image.

Also, the record unit 350 records the input member identification information and the input image data indicating the inspection image, in a recording medium in an associated manner. In this case, the record unit 350 preferably records the member identification information in a header section of an image file in which the image data is to be recorded.

Second Embodiment of Member Identification Information Acquisition

In a second embodiment of member identification information acquisition, the measurement plane range illustrated in FIG. 9 is compared with a drawing plane range (see Expression 6) of each member registered in the member table 332, the corresponding member is specified by extracting the drawing plane range that is the most approximate to the measurement plane range, and acquires the member identification information (element number) registered in association with the specified member.

While the members are narrowed down by using the plane equation in the first embodiment, the estimation accuracy for the drawing plane is higher in the first embodiment than that of the second embodiment, and hence the measurement accuracy for the plane range may be lower in the first embodiment than that of the second embodiment.

Third Embodiment of Member Identification Information Acquisition

Figure 18:
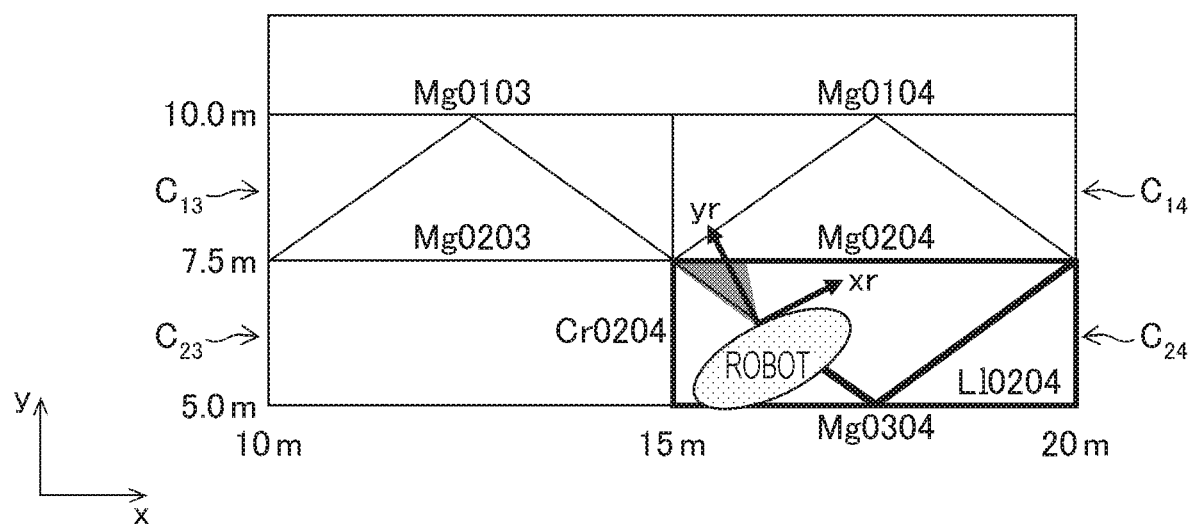
FIG. 18 illustrates another embodiment that acquires member identification information on a member from a measurement plane and a drawing plane.

In a third embodiment of member identification information acquisition, member identification information (member type+element number) on a member to be measured that can be image captured from the position (imaging position) of the twin-lens camera 202 mounted on the robot device 100 as illustrated in FIG. 18 is associated with a panel (coffer) of the bridge 1 where the twin-lens camera 202 is located and registered in the member table 332 in advance.

For example, FIG. 18 illustrates panels $C_{13}$, $C_{14}$, $C_{23}$, and $C_{24}$ of the bridge 1. When the twin-lens camera 202 is located in the panel $C_{24}$, the members (member types and element numbers) that can be image captured at this position are as follows.

Main girders: Mg0204, Mg0304
Cross beam: Cr0204
Lower lateral frame: Ll0204

By detecting the panel in which the twin-lens camera 202 is located from a plurality of panels of the bridge 1 in accordance with the position of the twin-lens camera 202, the panel can be specified, and the members to be measured can be narrowed down by using the specified panel.

Then, one member is specified by comparing the plane equation indicating the measurement plane with each of the plane equations indicating the drawing planes of the members narrowed down as described above, and the member identification information (element number) registered in association with the specified member is acquired.

Also, one member is specified by comparing the measurement plane range with each of the drawing plane ranges of the members narrowed down as described above, and the member identification information (element number) registered in association with the specified member is acquired.

Structure Member Specification Method

Figure 19:
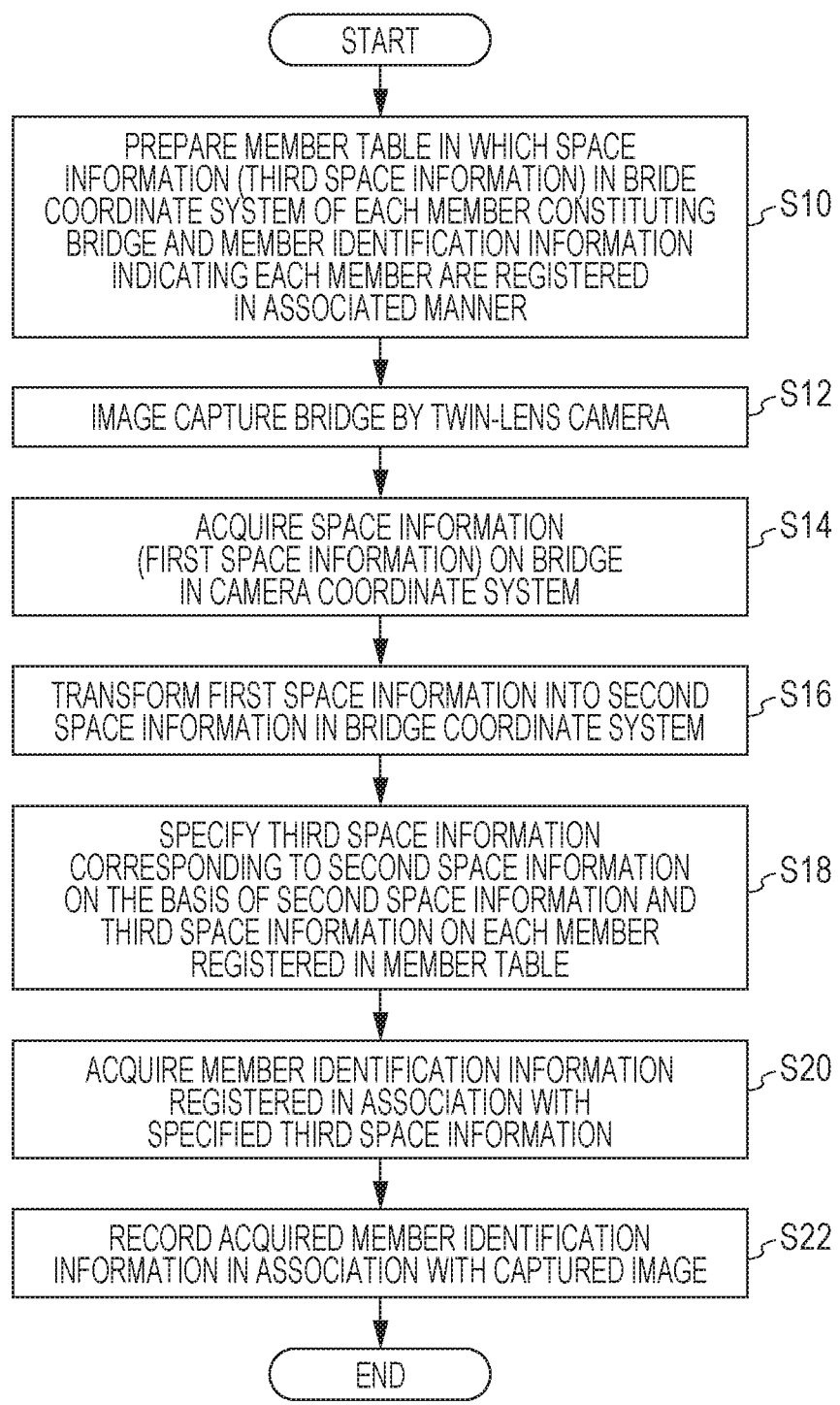
FIG. 19 is a flowchart illustrating an embodiment of a structure member specification method according to the invention.

FIG. 19 is a flowchart illustrating an embodiment of a structure member specification method according to the invention.

In FIG. 19, a member table is prepared in which space information (third space information) in a bridge coordinate system of each member that constitutes a bridge and member identification information (member type+element number) indicating each member are registered in an associated manner (step S10).

Then, an inspector (an inspector for the bridge) remotely operates the robot device 100 by using the terminal device 300 to cause the twin-lens camera 202 mounted on the robot device 100 to image capture an inspection member of the bridge (step S12).

The first space information acquisition unit 322 (FIG. 6) of the terminal control unit 320 receives a first image $I_L$ and a second image $I_R$ with different parallax captured by the twin-lens camera 202, and acquires first space information on the bridge corresponding to an imaging range of the twin-lens camera 202, the first space information being first space information on the bridge in a camera coordinate system, on the basis of the received first image $I_L$ and second image $I_R$ (step S14).

The transformation unit 324 of the terminal control unit 320 transforms the acquired first space information on the bridge in the camera coordinate system into second space information in the bridge coordinate system on the basis of transformation information, such as the imaging position and the imaging direction of the twin-lens camera 202 (step S16).

The member identification information acquisition unit 326 of the terminal control unit 320 specifies, on the basis of the second space information indicating the inspection member and transformed to be in the bridge coordinate system and the third space information registered in the member table 332, third space information corresponding to the second space information (step S18), and acquires the member identification information registered in association with the specified third space information from the member table 332 (step S20).

The record unit 350 that inputs the member identification information from the terminal control unit 320 and the captured image (one image of the first image $I_L$ and the second image $I_R$) records the member identification information and the captured image (inspection image) in an associated manner.

Since the member identification information (member type and element number) of the inspection member captured in the inspection image (inspection photograph) is recorded in association with the inspection photograph, the member identification information on the inspection member can be easily and accurately acquired, and the inspection record can be efficiently created.

Figure 20:
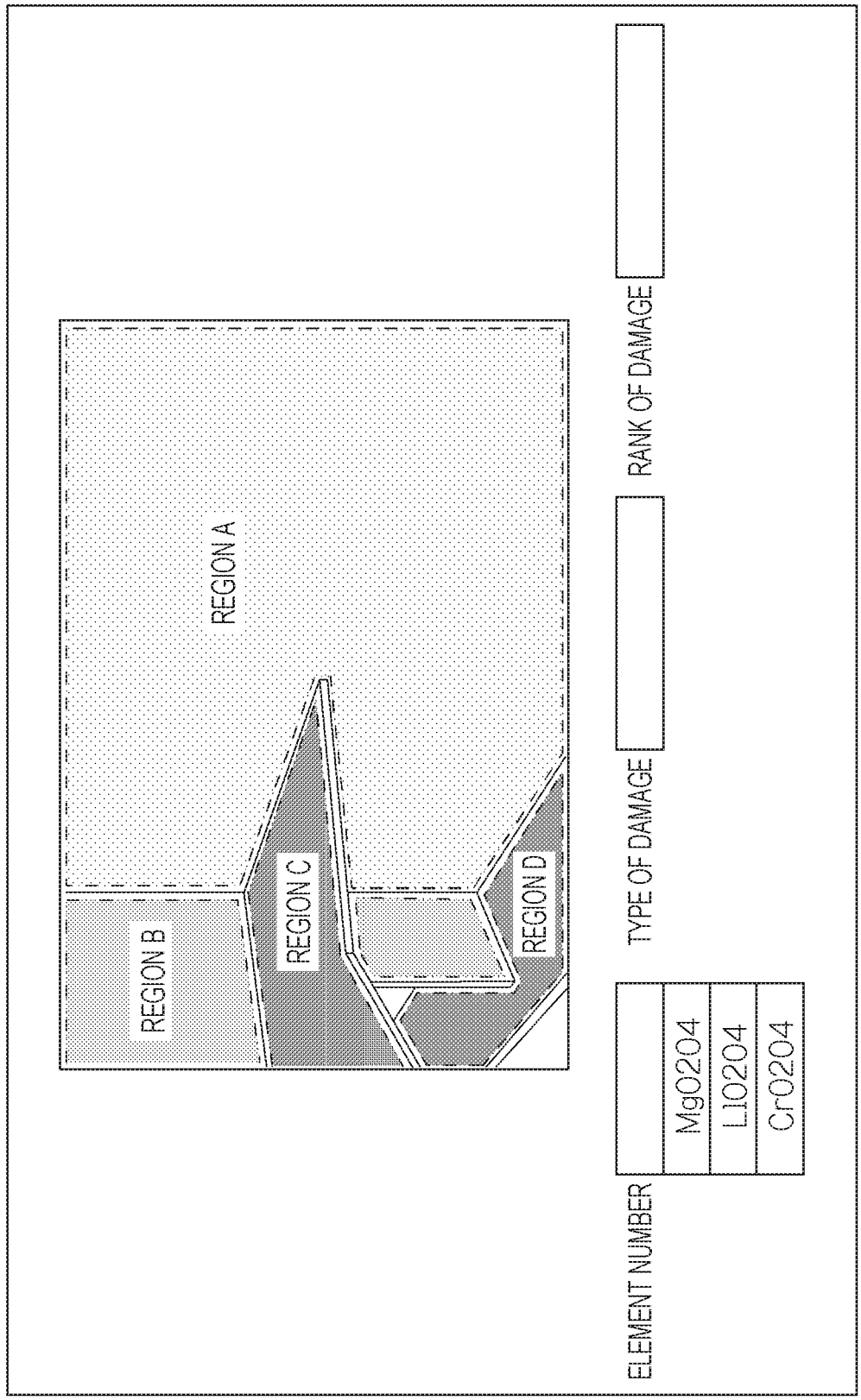
FIG. 20 illustrates an operation screen for selecting a corresponding element number from an element number list of members.

FIG. 20 illustrates an operation screen for selecting a corresponding element number from an element number list of members, or an example of a display screen of the display unit 340.

In the example illustrated in FIG. 20, an inspection image captured by the imaging device 200 and member identification information (element number) on a member of a bridge in the inspection image acquired on the basis of the inspection image are displayed.

In the inspection image, plane regions (four regions A to D) of respective members that constitute the bridge 1, and three element numbers specified on the basis of space information (first space information) on the regions A to D are displayed.

In particular, the inspection image includes one inspection member having damage, and one or more non-inspection members not having damage. When candidates of a plurality of pieces of member identification information (in this example, three element numbers of Mg0204, Ll0204, and Cr0204) are displayed on the display unit 340, the inspector operates the input unit 330 that functions as a selection instruction unit, and instructs selection of member identification information corresponding to the inspection member from the candidates of the plurality of pieces of member identification information, by using a mouse cursor or the like.

The member identification information acquisition unit 326 illustrated in FIG. 6 specifies member identification information from the candidates of the member identification information on the inspection member, in response to the instruction for the selection of the member identification information to be input from the input unit 330, and acquires the member identification information for the inspection member.

Also, the inspector can input at least one of the type of damage or the rank of damage of the inspection member by using the display screen of the display unit 340 illustrated in FIG. 20, by using the input unit 330. The type of damage of the inspection member is, for example, cracking, fissure, corrosion, loosening, disconnection, falling off, and breakage. The rank of damage is, for example, damage that requires an urgent countermeasure, damage that requires specific investigation, damage that requires work for maintenance, and damage that requires repair.

At least one piece of information on the type of damage or the rank of damage of the inspection member input by the input unit 330 as described above is preferably recorded in the record unit 350 in association with the captured image (inspection image).

Also, when the candidates of the plurality of pieces of member identification information are displayed on the display unit 340, the inspector may operate the input unit 330 that functions as a first space information designation unit, and designate space information (first space information) indicating the inspection member or the damage position of the inspection member by designating the inspection member or the damage position of the inspection member on the screen of the display unit 340, instead of selecting the member identification information corresponding to the inspection member.

In this case, the member identification information acquisition unit 326 specifies the member identification information corresponding to the designated inspection member from the candidates of the plurality of pieces of member identification information displayed on the display unit 340 by using the designated first space information, and acquires the specified member identification information as the member identification information for the inspection member.

While the first space information indicating the inspection member or the damage position of the inspection member by manually operating the input unit 330 when the candidates of the plurality of pieces of member identification information are displayed on the display unit 340 in the above-described example, the inspection member having damage may be automatically specified.

The image processing unit 328 illustrated in FIG. 6 detects damage by image processing on the basis of an image captured by the imaging device 200 (in this example, the first image $I_L$ captured by the first imaging unit 202A of the twin-lens camera 202), specifies the inspection member having the detected damage, and outputs the space information on the specified inspection member to the member identification information acquisition unit 326.

The member identification information acquisition unit 326 specifies second space information on one member (inspection member) on the basis of the space information on the inspection member specified by the image processing unit 328 when inputting second space information on a plurality of members (plane equations indicating a plurality of measurement planes, a plurality of measurement plane ranges), and acquires member identification information corresponding to the specified second space information (inspection member).

Other Embodiment of Imaging Device

While the twin-lens camera 202 is used as the imaging device 200, and the three-dimensional coordinates (camera coordinate system) of the plurality of feature points of the structure (bridge) corresponding to the imaging range of the twin-lens camera 202 and the image of, for example, the inspection member (inspection image) are acquired in this embodiment, the present invention is not limited to the case using the twin-lens camera as the imaging device. For example, a time of flight camera (hereinafter, referred to as "TOF camera"), a laser scanner, or an imaging system using a motion stereo method that acquires a continuous image by moving a single-eye imaging device may be applied.

The TOF camera is a camera that irradiates a photographic subject with light (near-infrared pulse light), and measures the time required until reception of the reflected light by a sensor (image sensor), thereby obtaining the distance to the photographic subject. The TOF camera can capture a range image and a normal image. In this case, the range image is a two-dimensionally distributed image of range information to the photographic subject (structure) obtained by the TOF camera. Each pixel of the range image has range information. Thus, the three-dimensional coordinates of the structure image captured by the TOF camera can be acquired as the first space information on the structure.

The laser scanner performs scanning by using near-infrared laser light in horizontal and vertical directions, and can obtain a range image. The laser scanner is preferably able to acquire red (R), green (G), and blue (B) images that can be used as inspection images.

The motion stereo method is a method of estimating a distance by obtaining an optical flow on the basis of time-series images captured while moving the single-eye imaging device.

Others

While the bridge is image captured by the robot device on which the imaging device is mounted in this embodiment, it is not limited thereto. The inspector may carry the imaging device to a target imaging position, direct the imaging device to an inspection member, and perform imaging. Alternatively, a pilotless airplane (drone) on which the imaging device is mounted may image capture the bridge. Note that it is required to acquire information on the position (imaging position) of the imaging device at imaging and the imaging direction by a GPS device, an azimuth sensor, or any of other methods.

Information indicating the image captured by the imaging device, range image, and information on the imaging position and the imaging direction acquired by the imaging device are not limited to information acquired from the imaging device via wireless communication, and the information may be acquired via wired communication from the imaging device, or a recording medium of the imaging device.

REFERENCE SIGNS LIST

1 . . . bridge, 2 . . . main girder, 202 . . . twin-lens camera, 3 . . . cross beam, 4 . . . cross frame, 5 . . . lateral frame, 6 ... deck slab, 10 ... inspection system, 100 ... robot device, 102 ... main frame, 104 ... vertical expansion arm, 104A ... camera installation portion, 106 ... housing, 108 ... X-direction driving unit, 108A ... ball screw, 108B ... ball nut, 108C ... motor, 110 ... Y-direction driving unit, 110A ... tire, 110B ... tire, 112 ... Z-direction driving unit, 120 ... pan-tilt mechanism, 130 ... robot control unit, 200 ... imaging device, 202 ... twin-lens camera, 202A ... first imaging unit, 202B ... second imaging unit, 204 ... imaging control unit, 206 ... pan-tilt driving unit, 210 ... pan-tilt control unit, 230 ... robot-side communication unit, 300 ... terminal device, 310 ... terminal-side communication unit, 320 ... terminal control unit, 322 ... first space information acquisition unit, 322A ... correspondence point detection unit, 322B ... distance calculation unit, 322C ... three-dimensional coordinate calculation unit, 322D ... member specification unit, 322E ... plane calculation unit, 324 ... transformation unit, 326 ... member identification information acquisition unit, 328 ... image processing unit, 330 ... input unit, 332 ... member table, 332D ... member specification unit, 340 ... display unit, 350 ... record unit, A ... region, A1 ... drawing plane range, A2 ... drawing plane range, B ... region, $I_L$ ... first image, $I_R$ ... second image, $L_1$ ... optical axis, $L_2$ ... optical axis, $O_r$ ... origin, P ... pan axis, P1 ... drawing plane, P2 ... drawing plane, T ... tilt axis, $\alpha$ ... pan angle, $\beta$ ... tilt angle

What is claimed is:

1. A structure member specification device comprising:
   an imaging device that image captures a structure composed of a plurality of members;
   a first space information acquisition circuit that acquires first space information on the structure corresponding to an imaging range of the imaging device, the first space information being first space information on the structure in a local coordinate system with reference to the imaging device;
   a transformation circuit that transforms, on the basis of transformation information for transforming space information in the local coordinate system into space information in a global coordinate system, first space information indicating a member included in the acquired first space information on the structure into second space information in the global coordinate system;
   a member table in which third space information on each of the members constituting the structure in the global coordinate system and member identification information indicating each of the members are registered in an associated manner;
   a member identification information acquisition circuit that specifies, on the basis of the second space information indicating the member and transformed to be in the global coordinate system and the third space information registered in the member table, the third space information corresponding to the second space information, and acquires member identification information registered in association with the specified third space information from the member table; and
   a member specification circuit that detects a plane region from the first space information or the second space information, and that assumes the detected plane region as a region indicating one member,
   wherein the first space information indicating the member or the second space information indicating the member is space information indicating the plane region assumed as the region indicating the member by the member specification circuit, and
   wherein the member included in an image captured by the imaging device is specified on the basis of the member identification information acquired by the member identification information acquisition circuit.

2. The structure member specification device according to claim 1, wherein the transformation information is information indicating an imaging position and an imaging direction when the structure is image captured.

3. The structure member specification device according to claim 1, wherein the member identification information acquisition circuit extracts, on the basis of a first member region in the global coordinate system in which the member exists and which corresponds to the second space information indicating the member, from second member regions in which the respective members exist in a one-to-one correspondence and which are registered in the member table, a second member region that is the most approximate to the first member region, and specifies the third space information corresponding to the extracted second member region.

4. The structure member specification device according to claim 1, wherein the member identification information acquisition circuit extracts, on the basis of a first plane equation for specifying a plane in the plane region assumed as the region indicating the member, from second plane equations indicating planes of the respective members registered in the member table, a second plane equation that is the most approximate to the first plane equation, and specifies the third space information having a plane corresponding to the extracted second plane equation.

5. The structure member specification device according to claim 1, comprising an output circuit that outputs the member identification information acquired by the member identification information acquisition circuit.

6. The structure member specification device according to claim 1, comprising a record circuit that records the image captured by the imaging device and the member identification information acquired by the member identification information acquisition circuit in an associated manner.

7. The structure member specification device according to claim 6, comprising:
   an input circuit that inputs at least one of a type of damage or a rank of damage on the member that is included in the image and that is specified on the basis of the member identification information,
   wherein the record circuit further records at least one of the type of damage or the rank of damage input by the input circuit, in association with the image captured by the imaging device.

8. The structure member specification device according to claim 1, comprising a display circuit that displays the image captured by the imaging device and the member identification information acquired by the member identification information acquisition circuit.

9. The structure member specification device according to claim 8, comprising:
   a selection instruction circuit that, when the image captured by the imaging device includes one inspection member having damage and one or more non-inspection members not having damage and a plurality of pieces of member identification information are displayed on the display, gives an instruction for selecting member identification information corresponding to the inspection member from the plurality of pieces of member identification information, wherein the member identification information acquisition circuit acquires the member identification information to which the instruction for the selection is given by the selection instruction circuit, as member identification information on the inspection member.

10. The structure member specification device according to claim 1, comprising:
an image processing circuit that specifies an inspection member having damage by image processing on the basis of the image captured by the imaging device,
wherein the member identification information acquisition circuit acquires the member identification information corresponding to the inspection member specified by the image processing circuit, as member identification information on the inspection member.

11. The structure member specification device according to claim 1, comprising:
a display that displays the image captured by the imaging device; and
a first space information designation circuit that, when the image captured by the imaging device includes one inspection member having damage and one or more non-inspection members not having damage and a plurality of members are displayed on the display, designates the first space information indicating the inspection member or a damage position of the inspection member,
wherein the member identification information acquisition circuit uses the first space information designated by the first space information designation circuit, for acquiring member identification information on the inspection member.

12. The structure member specification device according to claim 1, wherein the first space information acquisition circuit includes a twin-lens camera having a function as the imaging device, calculates three-dimensional coordinates of the structure from two parallax images captured by the twin-lens camera, and acquires the calculated three-dimensional coordinates as first space information on the structure.

13. The structure member specification device according to claim 1, wherein the first space information acquisition circuit includes a time of flight camera having a function as the imaging device, and acquires three-dimensional coordinates of the structure image captured by the time of flight camera, as first space information on the structure.

14. The structure member specification device according to claim 1, wherein the first space information acquisition circuit includes a laser scanner having a function as the imaging device, and acquires three-dimensional coordinates of the structure acquired by the laser scanner, as first space information on the structure.

15. The structure member specification device according to claim 1, wherein the first space information acquisition circuit acquires three-dimensional coordinates calculated by a motion stereo method on the basis of images in time series captured while the imaging device is moved, as the first space information.

16. A structure member specification method that is used for an inspection system comprising an imaging device that image captures a structure composed of a plurality of members, and a member table in which third space information on each of the members constituting the structure in a global coordinate system and member identification information indicating each of the members are registered in an associated manner, the method comprising:

acquiring first space information on the structure corresponding to an imaging range of the imaging device, the first space information being first space information on the structure in a local coordinate system with reference to the imaging device;
transforming, on the basis of transformation information for transforming space information in the local coordinate system into space information in a global coordinate system, first space information indicating a member included in the acquired first space information on the structure into second space information in the global coordinate system;
specifying, on the basis of the second space information indicating the member and transformed to be in the global coordinate system and the third space information registered in the member table, the third space information corresponding to the second space information, and acquiring member identification information registered in association with the specified third space information from the member table; and
detecting a plane region from the first space information or the second space information, and assuming the detected plane region as a region indicating one member,
wherein the first space information indicating the member or the second space information indicating the member is space information indicating the plane region assumed as the region indicating the member, and
wherein the member included in an image captured by the imaging device is specified on the basis of the acquired member identification information.

17. The structure member specification method according to claim 16,
wherein acquiring the member identification information from the member table includes
calculating a first member region in the global coordinate system in which the member exists, on the basis of second space information indicating the member,
extracting a second member region that is the most approximate to the first member region, on the basis of the calculated first member region, from second member regions in which the respective members exist in a one-to-one correspondence and which are registered in the member table, and
specifying the third space information corresponding to the extracted second member region.

18. The structure member specification method according to claim 16,
wherein acquiring the member identification information from the member table includes
calculating a first plane equation for specifying a plane in the plane region assumed as the region indicating the member, on the basis of the second space information indicating the member,
extracting a second plane equation that is the most approximate to the first plane equation, on the basis of the calculated first plane equation, from second plane equations indicating planes of the respective members registered in the member table, and
specifying the third space information having a plane corresponding to the extracted second plane equation.

* * * * *